United States Patent [19]

Bates

[11] 4,034,195
[45] July 5, 1977

[54] TEST APPARATUS AND METHOD

[75] Inventor: Danny E. Bates, Bartlesville, Okla.

[73] Assignee: Phillips Petroleum Company, Bartlesville, Okla.

[22] Filed: Jan. 22, 1975

[21] Appl. No.: 543,174

[52] U.S. Cl. .................. 235/153 AC; 340/146.1 E
[51] Int. Cl.² .................. G06F 11/00; G08C 25/00
[58] Field of Search .................. 235/153 AC; 340/146.1 E, 172.5; 324/73 R

[56] References Cited

UNITED STATES PATENTS

| 3,172,039 | 3/1965 | Bernstein | 324/73 R |
| 3,179,883 | 4/1965 | Farrow | 324/73 R |
| 3,622,877 | 11/1971 | MacDavid et al. | 340/146.1 E |
| 3,633,178 | 1/1972 | Zopf | 340/146.1 E |
| 3,673,397 | 6/1972 | Schaefer | 235/153 AC |
| 3,733,585 | 5/1973 | Merlo | 340/146.1 E |
| 3,745,529 | 7/1973 | Engle | 340/146.1 E |
| 3,760,354 | 9/1973 | Ginn | 340/146.1 E |
| 3,764,995 | 10/1973 | Helf, Jr. et al. | 340/172.5 |
| 3,790,885 | 2/1974 | James | 324/73 R |
| 3,831,149 | 8/1974 | Job | 235/153 AC |
| 3,832,535 | 8/1974 | Vito | 235/153 AC |
| 3,904,861 | 9/1975 | McNamara | 235/153 AC |
| 3,927,310 | 12/1975 | D'Anna et al. | 235/153 AC |

Primary Examiner—Charles E. Atkinson

[57] ABSTRACT

A test apparatus is adapted to accept a manually entered binary data message, to transmit the message serially to a remote unit, to receive a responsive serial message from the remote unit, and to display the responsive message so that it can be compared to the desired response. In addition the test apparatus is adapted to generate an error code which is transmitted to the remote unit at the end of each message for use by the remote unit in detecting an error in transmitted information. The tester also generates a similar error code upon receipt of a return message from the remote unit and compares the error code thus generated with an error code transmitted by the remote unit to determine whether there is an error in transmission of the return message. In addition, the test device can transmit a message and the associated error code from its own output to its own input to provide an internal test of its operation.

16 Claims, 12 Drawing Figures

TEST APPARATUS AND METHOD

This invention relates to an apparatus and method for testing remote units associated with digital computer installations. In another aspect it relates to a self-testing apparatus and method for testing the operation of the test unit.

The expanding use of digital computers and the application of computerized techniques to the needs of various business and industrial operations has resulted in the development of many systems in which a central or master computer communicates with one or more remote units. Such systems are found, for example, in data acquisition or distribution systems, process control systems, and other similar systems in which a primary or central computer control system utilizes one or more remote units to provide it with information, to aid in implementing various control functions, or to otherwise assist in performing operations which the computer, due to its physical separation from the site of the desired operation, does not perform directly.

During the course of manufacturing, installing, and maintaining remote units intended for use with a central computer system it is desirable to provide an apparatus and method for testing a remote unit without requiring the use of the central computer. During the course of building, testing, and installing a remote unit in a new or existing system it is desirable to be able to comprehensively test the unit at the time of construction, to check the operability of the unit after it has been shipped to the location at which it will be installed, and to test the unit for the purpose of isolating any malfunction which may be exhibited by the newly-installed unit and its associated equipment. In the case of an existing unit, it is desirable to permit testing of the unit in order to isolate and correct any malfunction within the system. Use of a computer in performing such tests has serious disadvantages in that such computers are expensive and are ordinarily not readily transportable from one location to another. In the case of a remote unit which is being installed in an existing computer system or a remote unit of an existing system which requires testing, use of the computer with which it is associated to test the remote unit limits the efficiency with which a remote unit malfunction can be isolated since the operation of the remote unit, all data links connecting the remote unit to the main computer, and the main computer itself form an integral part of the test apparatus. In addition, the process of detecting and isolating a malfunction within a remote unit ordinarily requires a substantial amount of human study and test procedure implementation with time required between successive test steps to evaluate the test results and determine the next step to be taken. These troubleshooting procedures, while they can be accomplished relatively quickly in human terms, are exceptionally slow in terms of computer operation and would utilize an inordinately large amount of computer time which could otherwise be used in the performance of the computer's usual functions.

Accordingly, it is an object of the invention to provide an apparatus and method for testing remote units associated with digital computer systems. Another object of the invention is to provide a test apparatus and method which utilize a compact and portable test device. Yet another object of the invention is to provide a self-testing test apparatus and method. Still another object of the invention is to provide a test apparatus and method which is adaptable for use with various data formats and transmission rates.

In accordance with the invention a remote unit which has been disconnected from the data lines communicating with a main computer is connected by means of its ordinary communication terminals to the test apparatus of the invention. The person conducting the test selects a data message to be transmitted to the remote unit and initiates the testing operation. The test apparatus of the invention thereupon places the selected message into a format which can be received and acted upon by the remote unit under test, transmits the message to the remote unit, and stands by for a response from the remote unit. Since the data transmitted to the remote unit by the test apparatus is placed into the same format, including the addition of an error code where applicable, as information normally received by the remote unit from a central computer, the remote unit responds to the signal from the test apparatus in the same manner that it would respond to the same signal from the central computer and, upon receipt of the signal, performs the requested operation, provides the requested information, or otherwise complies with the message request, then generates and transmits a return message. Although such a return message from a remote unit would ordinarily be received and acted upon by the central computer, interposition of the test apparatus will result in the return message being received by the test apparatus and displayed. By observing the display and comparing the remote unit response with the correct response to the previously transmitted message, the person conducting the test can determine whether the remote unit would have responded correctly to such a message from the computer and, in the case of an incorrect response, can further proceed to isolate the cause of the malfunction within the remote unit. To insure against errors originating within the test unit itself, the message prepared for transmission to the remote unit can be transmitted to the test apparatus input and displayed to test the operation of the test apparatus. The preferred embodiment of the invention hereinafter described is relatively inexpensive, is adaptable for use with a variety of data transmission rates and formate, and is compact enough to fit into a small tool box or brief case.

Other objects and advantages of the invention will be apparent from the specification and claims and from the detailed description of the drawing in which:

Figure 1:
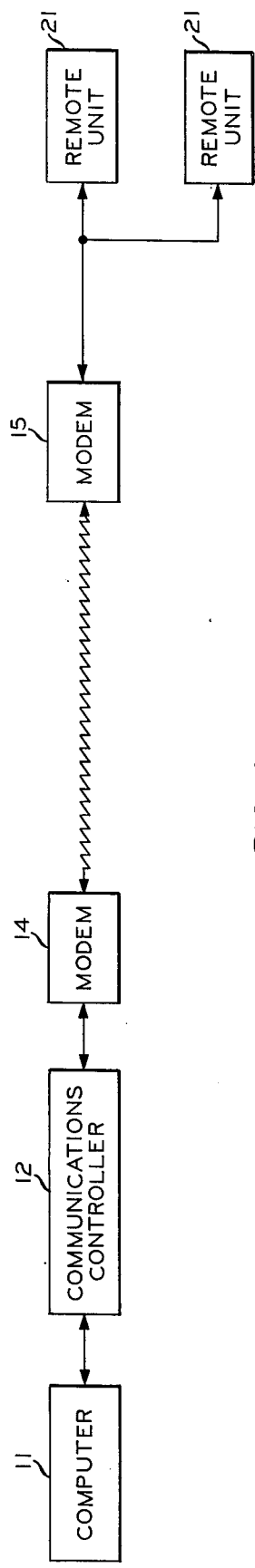
FIG. 1 is a schematic block diagram of a computer system employing a plurality of remote units.

Referring now to FIG. 1, there is illustrated a computer 11 which is a central or primary computer associated with, for example, a production or information control system. The computer 11 is in two-way communication with a communication controller 12 which controls the input and output information to the computer 11, modifying the form or format of the binary data messages passing therethrough to prepare them for either input to the computer or transmission to a remote unit via a suitable data link. The communications controller 12 is in two-way communication with a modem 14 which is, in turn, in two-way communication with a like modem 15 for transmitting data over long distances to one or more remote units 21 and transmitting data from the remote units 21 back to the communications controller 12 and computer 11. Although a modem data link has been illustrated and is particularly useful in remote areas or hostile environments where other means of data communication are not available or are not reliable, the use of other data link means such as telephone line, various telemetry links, or, where speed of communication is not essential, a recorded magnetic tape as well as other similar means for conveying information from the communications controller 12 to a remote unit 21 is within the scope of this disclosure. In ordinary operation of the computer system of FIG. 1, the computer 11 will initiate a binary data message for a remote unit 21. This message will be conveyed via the communications controller 12 and the modems 14 and 15 to the remote unit 21 which will, in response to the message signal, perform the specified function or obtain the specified data and generate a return message confirming that the remote unit has received and obeyed the computer message and/or transmitting the requested data. The return message is then transmitted via the modems 15 and 14 and the communications controller 12 to the computer 11.

Figure 2:
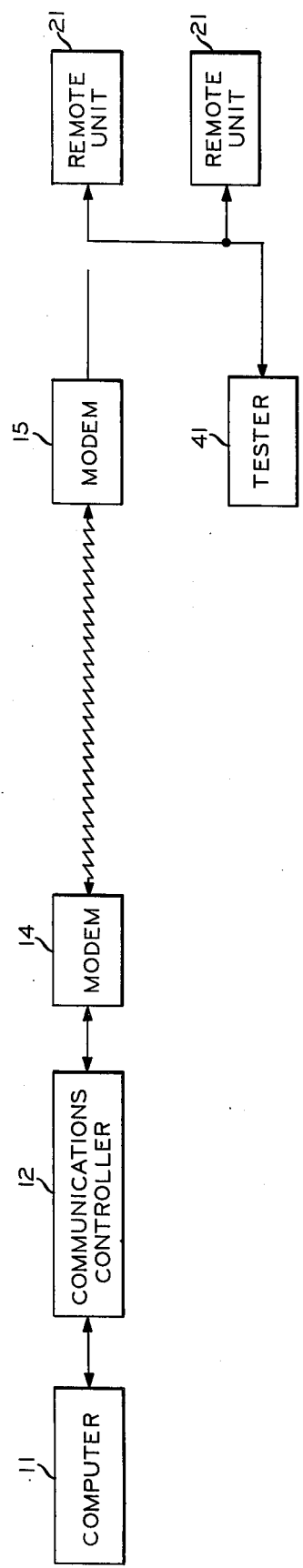
FIG. 2 is a schematic block diagram of the system of FIG. 1 showing insertion of the test apparatus of the invention for use in testing the remote units.

When a malfunction in a remote unit associated with a system such as the one illustrated in FIG. 1 is suspected, communication between the modem 15 and the remote units 21 can be suspended and the remote units can be placed in communication with a tester 41 as illustrated by FIG. 2. While the tester 41 could be inserted into the system to communicate with the remote units 21 via the modems 14 and 15, provided the output and input of the tester 41 were properly adapted to communicate compatibly with the modem 14, insertion of the tester 41 at that location would not permit definite isolation of only errors within the remote units 21. Communication of the tester 41 directly with the remote units 21 is therefore preferred for troubleshooting the remote units 21 or for isolation of error sources within the remote units 21. In the event that testing of the remote units 21 proves the remote units to be operating correctly, insertion of a tester 41 at another point in the communications system to test the remote units again through all or part of the data link could be useful in isolating a malfunction in the data link to the remote units 21.

When the tester 41 is installed as illustrated in FIG. 2, it initiates messages to the remote units 21 which are received and utilized by the remote units 21 in the same way that the same message initiated by the computer 11 would be received and utilized, and the response generated by the remote units 21 is identical to the response which would be generated from such a computer message. The response generated by the remote units 21 is received by the tester for use in determining whether the remote units 21 have responded correctly.

Figure 3:
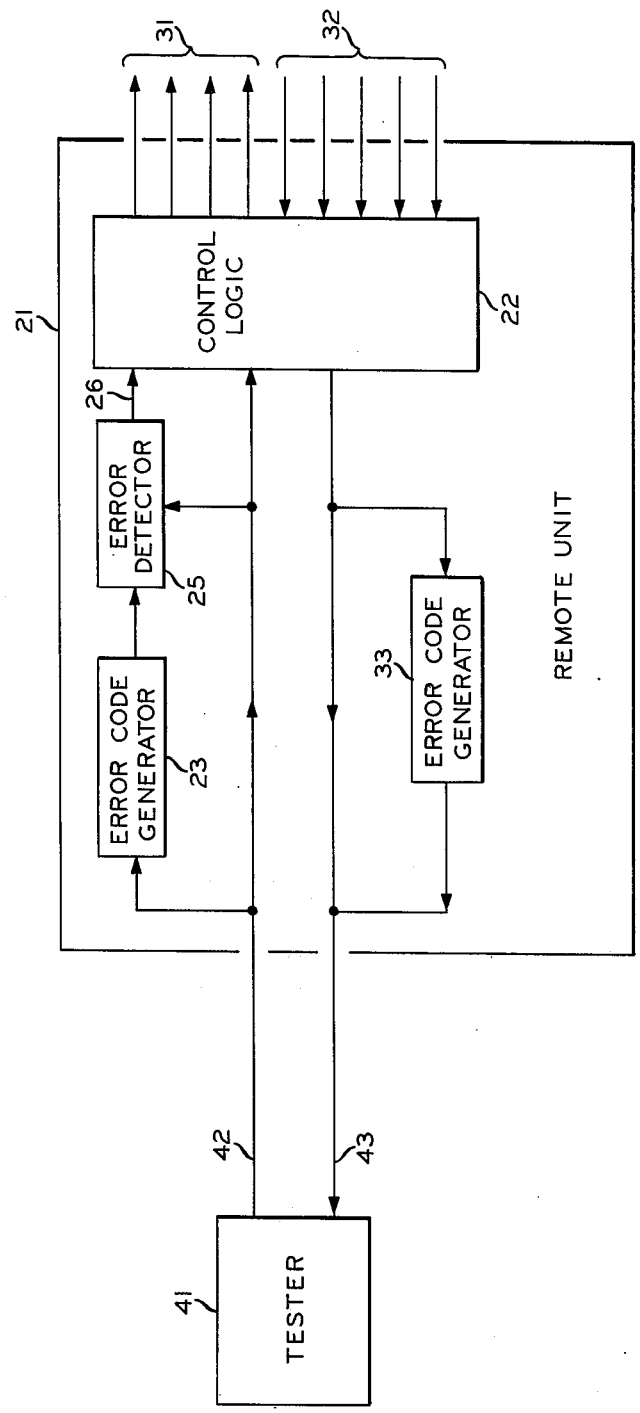
FIG. 3 is a schematic block diagram of a remote unit in communication with a tester.

FIG. 3 illustrates the apparatus and method by which a remote unit 21 responds to a message signal by generating a return message signal. A message signal is delivered from the serial output line 42 of the tester 41 to the input of the remote unit 21 where it is received by the control logic means 22 associated with the remote unit 21. As the message is being received by the remote unit an error code generator 23 generates an error code in response to the message. An error detector 25 compares the error code generated by the error generator 23 with an error code transmitted at the end of the message and, if the two error codes do not bear the desired relationship to each other, delivers an error signal 26 to the control logic 22. The control logic 22 is that part of the remote unit 21 which initiates the action called for by the message from the tester 41 and generates a return message which is delivered to the serial input line 43 of the tester 41. In addition to lines of communication which can be used to receive messages from and send return messages to a computer 11 or, in this case, a tester 41, the remote unit 21 and control logic 22 associated therewith will ordinarily have a plurality of control data lines 31 for initiating control over a process or other operation, or telemetry data lines 32 for gathering information, or can have both control data lines 31 and telemetry data lines 32 associated therewith. When the message from the serial outlet line 42 of the tester 41 has been received by the control logic 22 of the remote unit 21 and the action designated by the message has been taken, the control logic means 22 will initiate and send a return message to the serial input line 43 of the tester 41. An error code generator 33 generates an error code in response to the return message and the error code generated by the generator 33 is transmitted to the serial input line 43 at the end of the return message. By suitable switching associated with the message receiving and return message sending modes of operation of the remote unit 21, a single error code generator 23 can be used to generate an error code for both the error detector 25 in conjunction with incoming message signals and to replace the error code generator 33 in conjunction with outgoing signals. The details of the control logic 22 associated with any particular remote unit 21 can vary widely. The tester 41 of the invention can be utilized in conjunction with many types of remote units which operate in the general manner illustrated and described.

Figure 4:
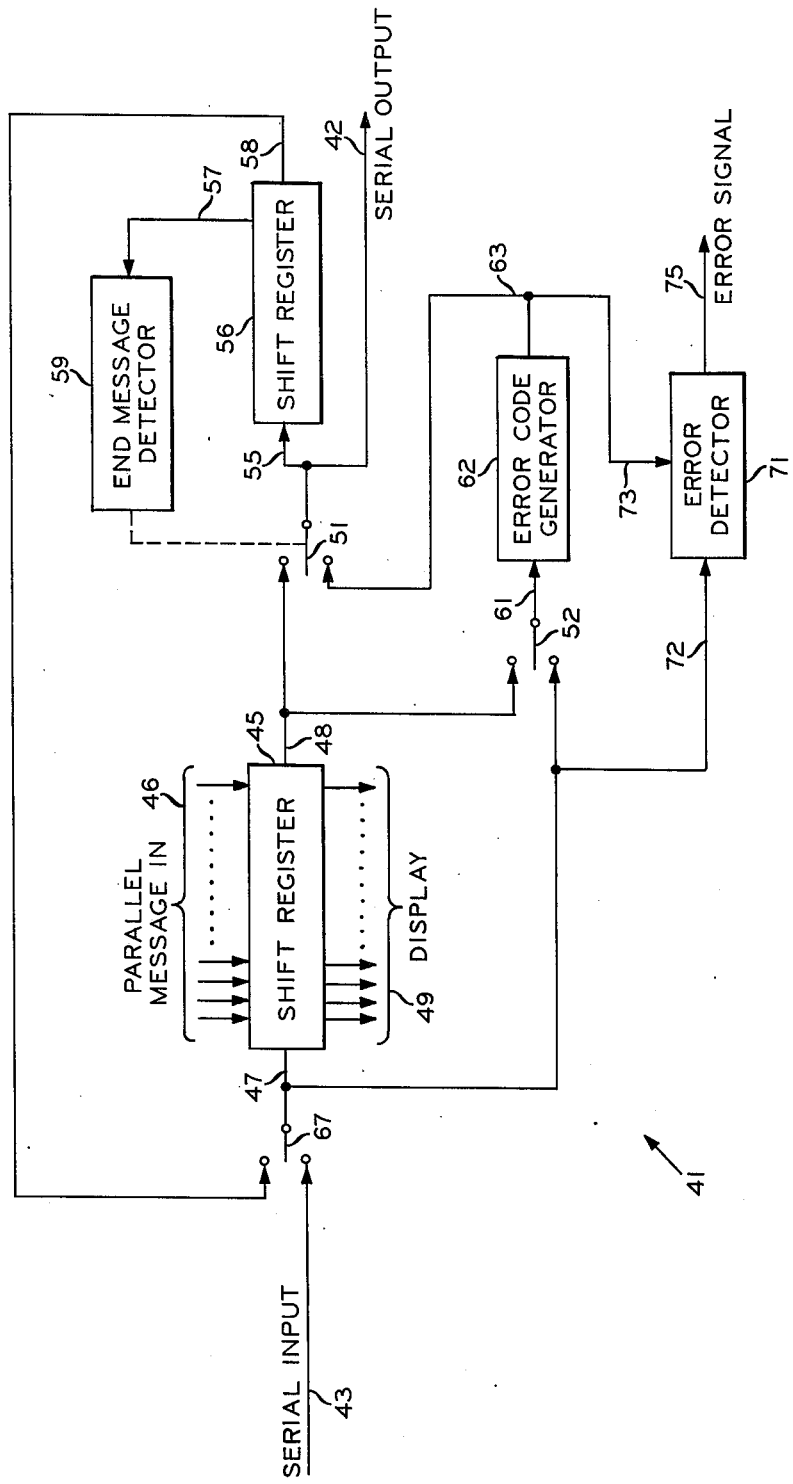
FIG. 4 is a schematic block diagram of the test apparatus of the invention.

The apparatus and method of the tester 41 are schematically illustrated in the block diagram of FIG. 4. A main shift register 45 having a plurality of data locations therein has associated therewith a plurality of parallel input lines 46, one for each data location within the shift register 45. In addition, there is a serial input line 47, a serial output line 48, and a plurality of parallel output lines 49 for use in displaying the data content of each data location within the shift register 45. Although the clock, load, reset, and other similar signals associated with the shift register 45 and other parts of the tester 41 have been omitted from the functional block diagram of FIG. 4, the shift register 45 uses such signals, as will be more precisely illustrated in conjunction with the description of a preferred embodiment of the tester 41, to load a message selected by the operator into the data locations of the shift register 45 via the parallel input lines 46 and to thereafter, at a rate controlled by a clock pulse, shift the data content of the shift register to the serial output line 48. When data is being shifted from the shift register 45, a switch means 51 connects the serial output line 48 to the serial output line 42 of the tester and to a serial input line 55 of an auxiliary shift register 56. A switch means 52 also connects the serial output line 48 of the shift register 45 to a serial input line 61 of an error code generator 62 whenever data is being serially transmitted from the shift register 45. When the complete contents of the shift register 45 have been transmitted to the shift register 56, the error code generator 62, and, via the serial output line 42, to the remote unit 21, a detecting means 59 connects the serial input 55 of the shift register 56 and the serial output 42 of the tester 41 to the serial output line 62 of the error code generator 62 in response to a signal 57 from the shift register 56 indicating that the entire contents of the shift register 45 have been shifted into the shift register 56. The error code generated within the error code generating means 62 during transmission of the serial data from the shift register 45 in thereupon transmitted to the shift register 56 and the serial output line 42. When the entire error code has been transmitted by the error code generator 62, operation of the tester 41 ceases pending receipt of a response message from the remote unit 21 to the tester serial input line 43. Since a logic zero is supplied to the serial input line 47 of the shift register 45 during shifting of its contents to its serial output line 48 and during the entire time that information is being transmitted from the serial output 42 of the tester, the parallel output lines 49 of the shift register 45 will provide an indication that the content of each data location within the shift register 45 is a logic zero. If information is not subsequently received from the remote unit 21 via the serial input line 43 the content of the shift register 45 will remain zero, indicating that the message was not received by the remote unit, that the message was received by the remote unit but an error was detected in transmission, or that a malfunction within the remote unit has precluded response by the remote unit 21 to the transmitted message. In this situation the operator may wish to determine that the message was properly transmitted by the tester 41 by initiating a self-test of the tester as hereinafter described. Whenever the tester 41 is not in its self-test mode, however, a switch means 67 will operably connect the serial input line 43 of the tester to the serial input line 47 of the shift register 45 in preparation for the receipt of a return message from the remote unit 21.

Absent a total failure of response by the remote unit 21, the remote unit will, upon receipt of the transmitted message, generate a return message and error code as hereinbefore described and transmit the return message and error code to the serial input line 43 of the tester 41. Whenever serial information is being received by the shift register 45 through its serial input line 47, the switch means 52 connects the serial input line 61 of the error code generating means 62 to the input line 47 of the shift register 45. As the return message is received from the remote unit 21 it is shifted into the shift register 45 and the error code generator 62. When the entire message portion of the transmission from the remote unit 21 has been received by the shift register 45, further operation of the shift register 45 is inhibited while the error code following the return message is delivered to a transmitted code input line 72 of an error detector means 71 and the error code generated by the error code generating means 62 is delivered to a generated error code input line 73 of the error detecting means 71. If the received error code from the serial input line 43 does not bear the desired relationship to the error code generated by the error code generating means 62 in response to the data transmitted to the shift register 45, the error detecting means 71 generates an error signal 75 which can be used to notify the test operator that there has been an error in transmission from the remote unit 21 to the tester 41, that the error code generating means 33 of the remote unit has malfunctioned, or that some other error code generation or error detection malfunction has occurred.

In order to check the operation of the tester 41 to rule out malfunctions in data transmission, error code generation, error code detection, or other similar functions within the tester 41, the tester 41, the test operator can reverse the switch means 67 to operably connect the serial input line 47 of the shift register 45 to a serial output line 58 of the auxiliary shift register 56 and to thereby place the tester 41 in a self-test mode. Operation of the tester in this mode is very similar to operation of the tester to test a remote unit. The data provided to the shift register 45 by its parallel input lines 46 is shifted out of the shift register 45 and into the auxiliary shift register 56 and error code generating means 62. When the entire message from the shift register 45 has been received by the shift register 56 and error code generator 62, the detecting means 59 connects the output 63 of the error code generator 62 to the input 55 of the shift register 56 and the error code generated in response to the message is shifted into the shift register 56. Instead of pausing to await a response from the remote unit at this point, the tester in its self-test mode will shift the combined message and error code data within the shift register 56 out of the shift register via the serial output line 58. The message and error code will be received by the shift register 45, error code generator 62, and error detector 71 in the same way that a return message and error code transmitted to the tester 41 via the serial input line 43 would be received. The message is shifted into the shift register 45 and the error code generator 62. The operation of the shift register 45 is then inhibited while the error detector means 71 compares the error code from the error code generator 62 with the error code received from the shift register 56. If the two error code signals do not bear the required relationship to each other, i.e., they are not the same, the error detector 71 will generate an error signal 75. When the message has been received by the shift register 45 and the error codes have been received by the error detector 71, operation of the tester 41 automatically ceases in either the remote test or self-test mode. If, upon completion of the self-test operation, the display associated with the parallel output lines 49 of the shift register 45 indicates that the content of each data location within the shift register is the same as that provided to it by the parallel input lines 46 at the beginning of the test operation and no error signal 75 is present, the operator will know that the tester 41 is operating correctly. In order to provide an additional test of the error code generator 62 during the self-test operation of the tester 41, it would be within the scope of this disclosure to provide a second error code generating means to generate an error code in response to either the data shifted from the shift register 45 or the data received by the shift register 45 and compare the outputs of the respective error code generating means utilizing the error detector 71. Since most commonly used error code generating means are hardware wired, however, the probability of error during the actual generation of the code is extremely small.

Although the apparatus and method of the invention are widely adaptable for use with many types of data formats and differing data transmission systems, the logic circuits required to implement one of many possible advantageous and useful embodiments of the invention is illustrated by FIGS. 5-12 of the drawing. The particular embodiment illustrated is adapted for use with a data transmission system utilizing a grounded signal as a logic zero and a predetermined positive voltage signal as a logic one. In the particular embodiment described, the supply voltage to the various circuit elements is the same as a voltage representing a logic one. The tester can be provided with its own source of supply voltage or, more commonly, will utilize the power supply of the tested remote unit 21 as the source of its supply voltage. The described preferred embodiment can be readily implemented utilizing, for example, complementary-symmetry metal oxide-semiconductor (COS/MOS or CMOS) integrated circuits.

Figure 5:
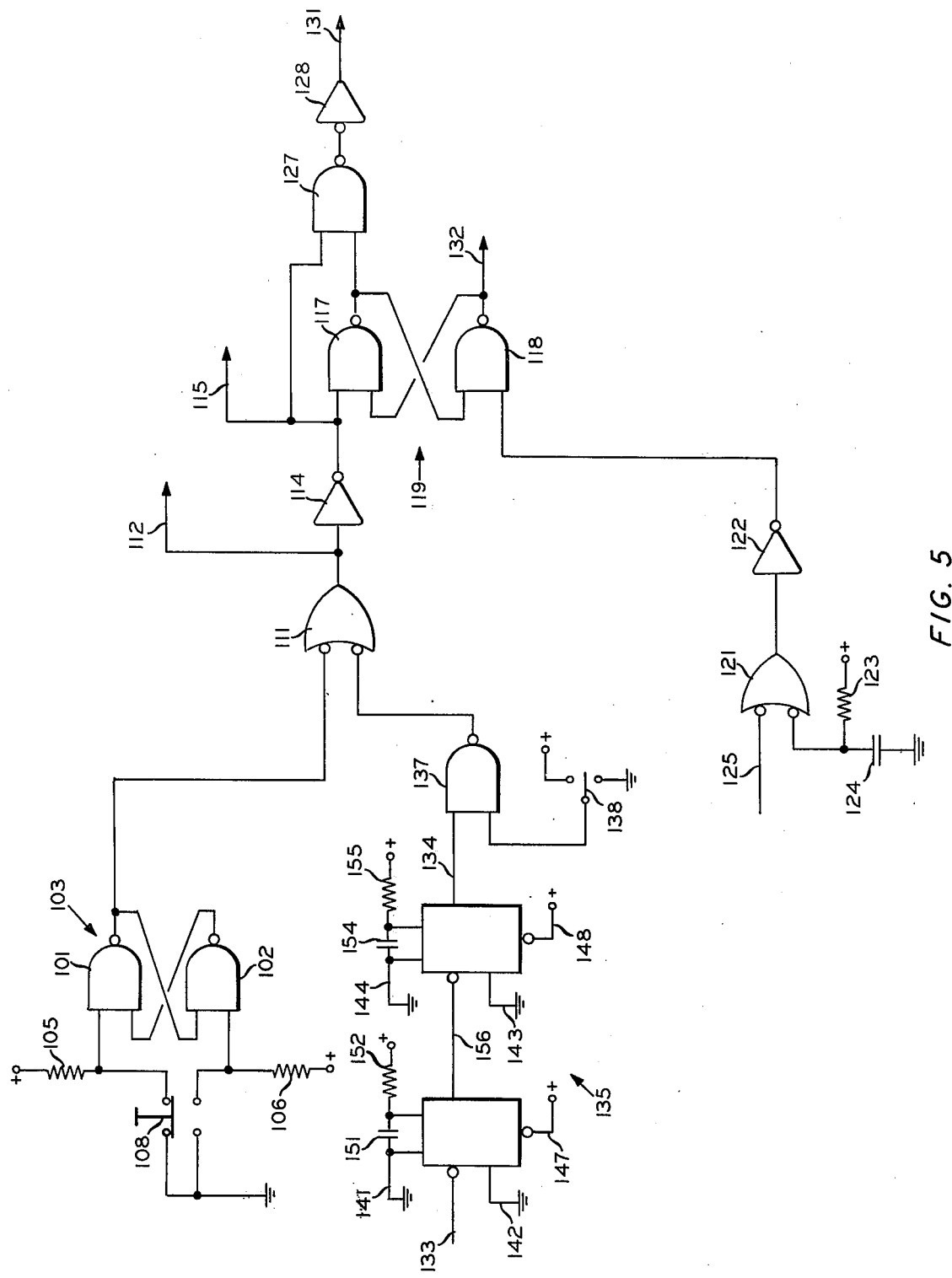
FIGS. 5–12 are schematic block diagrams of the specific binary logic circuits which can be used to implement a preferred embodiment of the invention.

FIG. 5 illustrates the apparatus and method by which operation of the tester 41 can be initiated. A pair of NAND circuits 101 and 102 are connected as a flip-flop circuit 103 with the output of each NAND circuit being utilized as one of the two inputs to the other. A resistor 105 connects the second input of the NAND circuit 101 to a positive voltage representing a logic one and a similar resistor 106 connects the second terminal of the NAND circuit 102 to a positive voltage source in the same manner. A momentary contact switch means 108 normally grounds the input terminal of the NAND circuit 101 connected to the resistor 105. In this position a logic zero is applied to one input terminal of the NAND circuit 101 causing the output signal therefrom to be a logic one. The logic one output of the NAND circuit 101 along with a logic one signal applied through the resistor 106 provide two logic one inputs to the NAND circuit 102 causing a logic zero output therefrom. When the switch 108 is depressed by the operator, a logic one signal is applied to the previously grounded input terminal of the NAND circuit 101 through the resistor 105 and one input terminal of the NAND circuit 102 is grounded, thereby causing the reversal of the output states of both NAND circuits 101 and 102 and causing the output of the NAND circuit 101 to be a logic zero.

As soon as the logic zero generated by the NAND circuit 101 in response to the depression of the execute switch 108 is received by an active low input terminal of the NAND circuit 111, the output of the NAND circuit 111 becomes a logic one, thereby generating a general reset signal 12. An inverter 114 generates a $\overline{\text{general reset}}$ signal 115 which will always be the opposite logic state from the general reset signal 112. The general reset and $\overline{\text{general reset}}$ signals 112 and 115 can be utilized as required throughout the remaining circuits of the tester to reset circuit elements having either positive or negative logic reset means in preparation for operation of the tester. Whenever a logic zero is applied to either terminal of the NAND circuit 111 a logic one general reset signal and a logic zero $\overline{\text{general reset}}$ signal will be produced.

A pair of NAND circuits 117 and 118 are connected as a flip-flop circuit 119 with the output of each being used as one of the two inputs to the other. The $\overline{\text{general reset}}$ output signal 115 of the inverter 114 is used as the second input to the NAND circuit 117. The second input to the NAND circuit 118 is generated by a NAND circuit 121 and an inverter 122. One negative logic input of the NAND circuit 121 is maintained at a logic one level by a resistor 123 connecting it to a logic one voltage source and a capacitor 124 which isolates it from ground. The other input terminal of the NAND circuit 121 is provided with an $\overline{\text{end transmission signal}}$ 125 which is a logic one at all $\overline{\text{times between}}$ the time of generation of the logic one general reset and logic zero $\overline{\text{general reset}}$ signals 112 and 115 and the time that transmission from the tester 41 to a remote unit 21 is complete. In the absence of a logic zero at either terminal of the NAND circuit 121, the output thereof is a logic zero and the output of the inverter 122 suplied to an input of the NAND circuit 118 is a logic one. Under these circumstances the output of the NAND circuit 117 is a logic one and the output of the NAND circuit 118 is a logic zero. With a logic one output from the NAND circuit 117 and a logic zero from the inverter 114 as its inputs, a NAND circuit 127 provides a logic one input to the inverter 128 which in turn provides a logic zero output signal.

When the operator releases the execute switch 108 and allows it to return to its original position, the output of the NAND circuit 101 becomes a logic one which, along with the presence of the additional logic one input to the NAND circuit 111 as will be described hereafter, causes the general reset signal 112 to become a logic zero and the $\overline{\text{general reset}}$ signal 115 to become a logic one. When the general reset signal becomes a logic one the output of the NAND circuit 117 of the flip-flop 119 remains unchanged since a logic zero is being applied to the other input of the NAND circuit 117 by the output of the NAND circuit 118. The presence of two logic one inputs to the NAND circuit 127 causes its output to become a logic zero which in turn causes the output of the inverter 128 to become a logic one. The output of the inverter 128 is utilized as a transmit signal 131 with the output of the NAND circuit 118 being used as a $\overline{\text{transmit}}$ signal 132.

In the absence of a $\overline{\text{restart}}$ signal 133 which can be generated as hereinafter described, the output signal 134 of a one-shot multivibrator means 135 will remain a logic zero, thereby causing the output of the NAND circuit 137 to provide a logic one to one input of the NAND circuit 111. In addition, a cycle switch 138 can be used to ground one input of the NAND circuit 137 to maintain the output thereof at a logic one regardless of the state of the output signal 134 from the one-shot multivibrator 135.

When the cycle switch 138 is utilized to connect one input of the NAND circuit 137 to a logic one source, the generation of a logic zero $\overline{\text{restart}}$ signal 133 at the end of normal tester operation will cause a logic zero output from the NAND circuit 137 to be applied to the input of the NAND circuit 111 thereby reinitiating tester operation. In this mode of operation the tester will repeatedly send the selected message to the remote unit 21 and receive the response thereto without further action being taken by the operator. This mode of operation is particularly useful when the remote unit 21 responds incorrectly to a message command and the test operator wishes to maintain repeated transmission of the test message while he studies the remote unit response utilizing an oscilloscope or other similar test or troubleshooting apparatus.

Although any suitable one-shot multivibrator means which will produce a single logic one output signal 134 of a preselected duration in response to the presence of a logic zero $\overline{\text{restart}}$ signal 133 can be utilized, the preferred one-shot multivibrator illustrated can be constructed from a dual monostable multivibrator integrated circuit No. MC 14528 manufactured by Motorola Semiconductor Products Incorporated. Using such a device, a one-shot multivibrator of the configuration illustrated can be achieved by grounding pins 1, 4, 12, and 15 utilizing leads 141, 142, 143, and 144 respectively; connecting pins 3 and 13 to a positive logic one voltage source utilizing leads 147 and 148 respectively; connecting a capacitor 151 between pins 1 and 2; connecting a resistor 152 between pin 2 and a logic one positive voltage; connecting a capacitor 154 between pins 14 and 15; connecting a resistor 155 between pin 14 and a logic one voltage source; connecting pin 6 and pin 11 by a lead 156; providing the restart signal 133 as an input to pin 5; and utilizing pin 10 as the source of the output signal 134 of the one-shot multivibrator 135.

Figure 6:
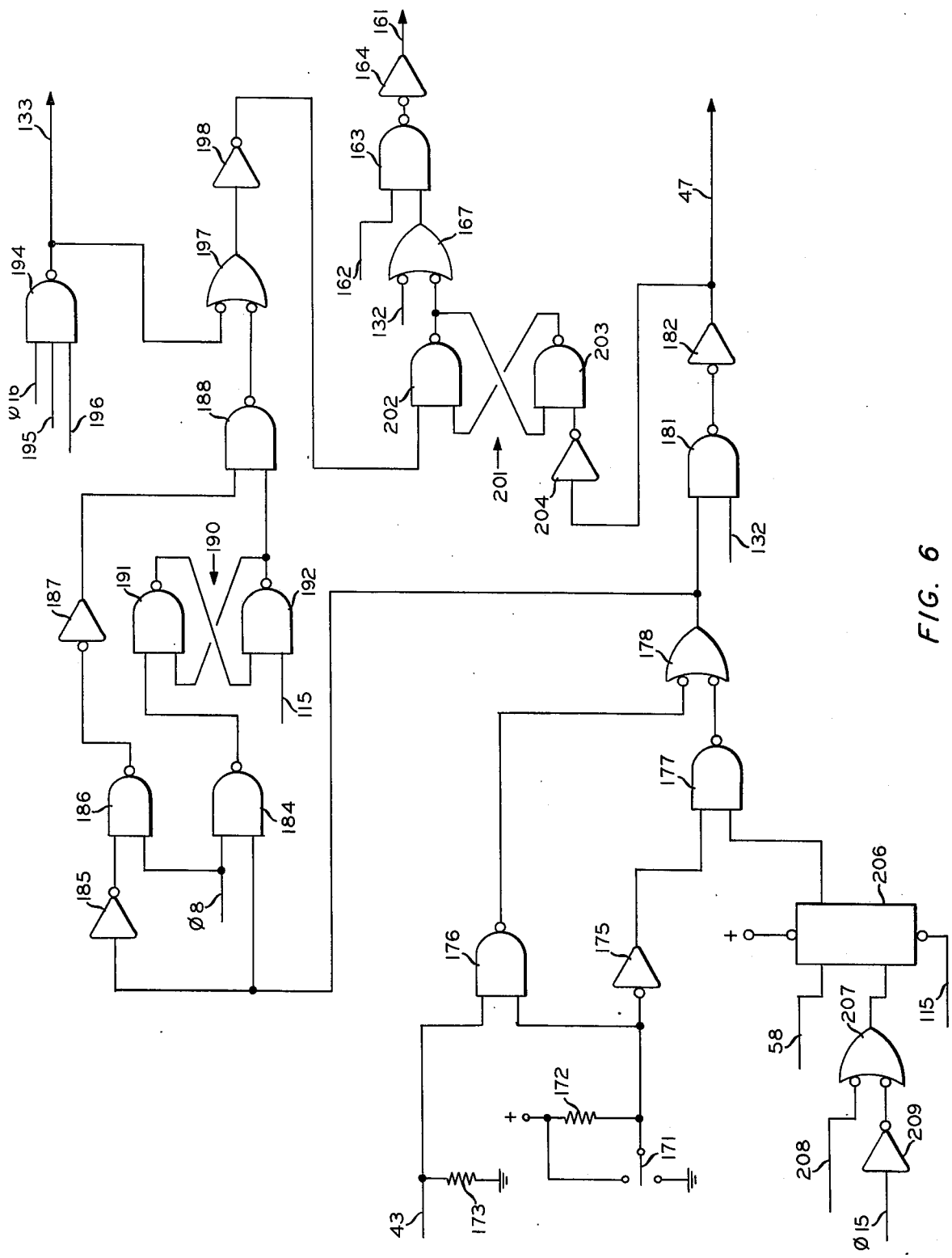

FIG. 6 illustrates the apparatus and method by which an oscillator signal 161 is provided in response to initiation of a test procedure or receipt by the tester 41 of a return message from a remote unit 21 being tested. An oscillator source signal 162 is continuously applied to one input of a two-input NAND gate 163. The oscillator source signal 162 can be the output of any suitable oscillator circuit or other similar oscillating means such as the circuit illustrated in FIG. 12. As long as the second input to the NAND circuit 163 is provided with a logic zero signal from the output of a NAND circuit 167, the output of the NAND circuit 163 provided to the inverter 164 will be a logic one and the oscillator signal 161 will be a grounded logic zero signal. When a logic zero is applied to either of the two inputs to the NAND circuit 167, however, the output of the NAND circuit 167 will be a logic one and the state of the oscillator source signal 162 will determine the logic state of the NAND circuit 163 output. With an oscillator source signal 162 which alternates between a logic one state and a logic zero state, the outputs of the NAND circuit 163 and the inverter 164 will likewise alternate between opposite logic one and logic zero states and the oscillator source signal 162 will be effectively passed through the NAND circuit 163 and the inverter 164 as the oscillator signal 161.

One manner in which a logic zero can be provided to an input of the NAND circuit 167 is by means of the transmit signal 132 which is provided directly thereto as one of the inputs. Generation of the transmit signal 132 in conjunction with startup of the test apparatus will therefore enable the oscillator signal 161 to be made operable in response to the oscillator source signal 162. When transmission of a message from the tester to a remote unit is complete and the end transmission signal 125 causes the transmit signal 132 to become a logic one, the oscillator signal 161 will once again be inhibited unless a logic zero is applied to the other terminal of the NAND circuit 167.

When the tester is being used to test a remote unit the self-test switch 171 connects the input of an inverter 175 and one of the inputs of a NAND circuit 176 to a logic one voltage source. In this position of the self-test switch 171 the output of the inverter 175 will be a logic zero, thereby forcing the output of a NAND circuit 177 to be a logic one. The other input of the NAND circuit 176 is the tester serial input lead 43 which is connected by a resistor 173 to ground in order to insure that the serial input lead 43 is at a grounded state when information is not being transmitted from the remote unit. With the presence of a logic one at the other input of the NAND circuit 176 and the logic one output of the NAND circuit 177 being utilized as one input to a NAND circuit 178, any binary signal from the serial input lead 43 will be inverted as it passes through the NAND circuit 176, will be again inverted as it passes through the NAND circuit 178, and will appear as the output of the NAND circuit 178 in its original form. With the transmit signal 132 applied to one input terminal of a NAND circuit 181 and the output of the NAND circuit 178 applied to the other input terminal thereof, the output signal of the NAND circuit 178 will again be inverted as it passes through the NAND gate 181 as long as the transmit signal 132 is a logic one, which it will be at any time after the tester has transmitted the message to the remote unit and is waiting for a response message therefrom. An inverter 182 inverts the output of the NAND circuit 181 to provide a gated input data signal to the serial input lead 47 of the shift register 45.

Figure 7:
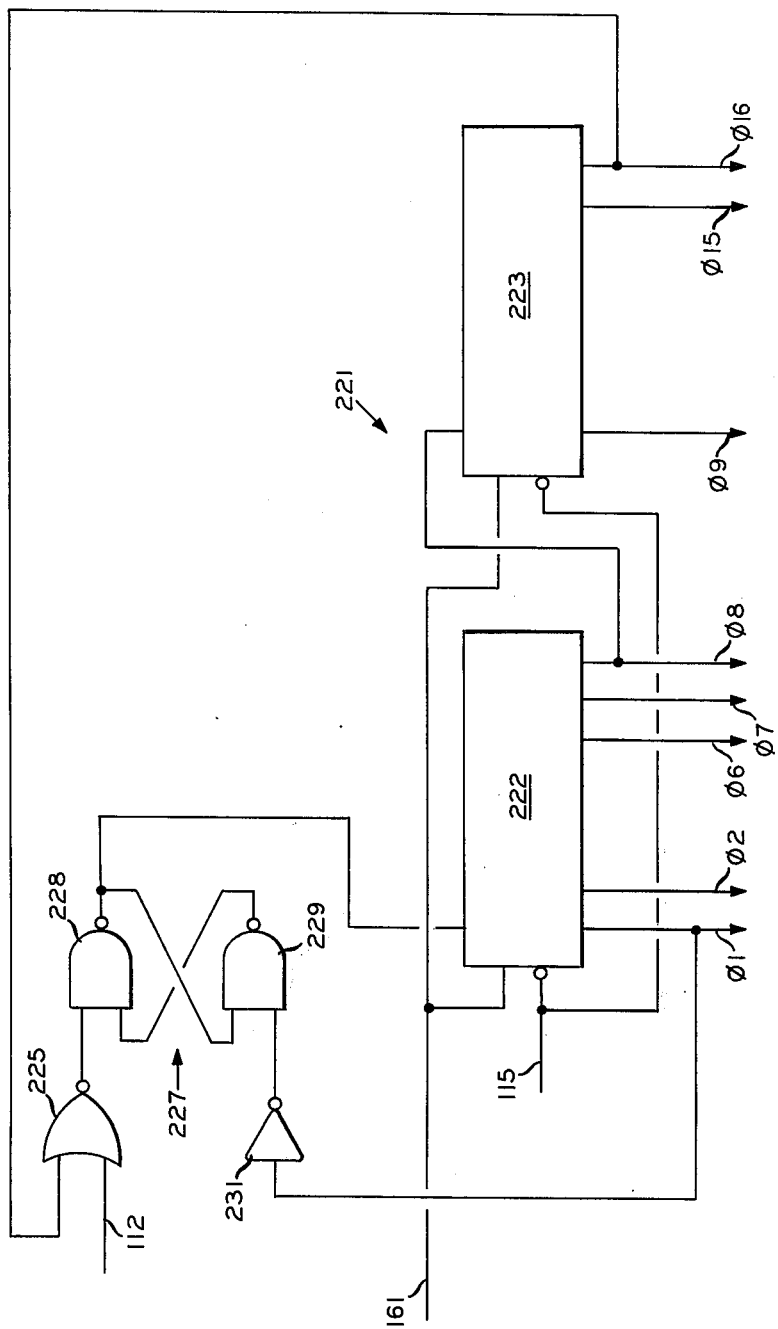

The data transmission system for which this specific embodiment of the invention is adapted utilizes a logic one synchronization pulse at the beginning of each message, both in transmissions to the remote unit and in transmissions from the remote unit to a computer or the tester. A message from the remote unit will therefore be initiated by a logic one appearing at the serial input lead 43 which will, in turn, result in a logic one appearing at the output of the NAND circuit 178 and at the output of the inverter 182. The output of the NAND circuit 178 is provided as one input to a NAND circuit 184 and to an inverter 185, the output of the inverter 185 being provided as one input to a NAND circuit 186. The other input to both NAND circuits 184 and 186 is a clock pulse eight φ8 signal source from a 16-phase clock. A preferred 16-phase clock is illustrated in FIG. 7. The nature of the phase eight φ8 signal is such that it will always be a logic zero except during one-sixteenth of the clock cycle at the middle of each clock cycle. Since the clock has not yet been started when the synchronization pulse is received by the tester the phase eight φ8 signal will be a logic zero, thereby forcing a logic one output from both NAND circuits 184 and 186. The output of the NAND circuit 186 is provided to an inverter 187 which inverts the logic one output signal and provides a logic zero as one input to a NAND circuit 188 thereby forcing the output of the NAND circuit 188 to be a logic one. A flip-flop 190 having two NAND circuits 191 and 192 has been previously reset by the general reset signal 115 provided as one input to the NAND circuit 192 so that the output of the NAND circuit 192 which is utilized as the second input to the NAND circuit 188 is a logic one.

Figure 9:
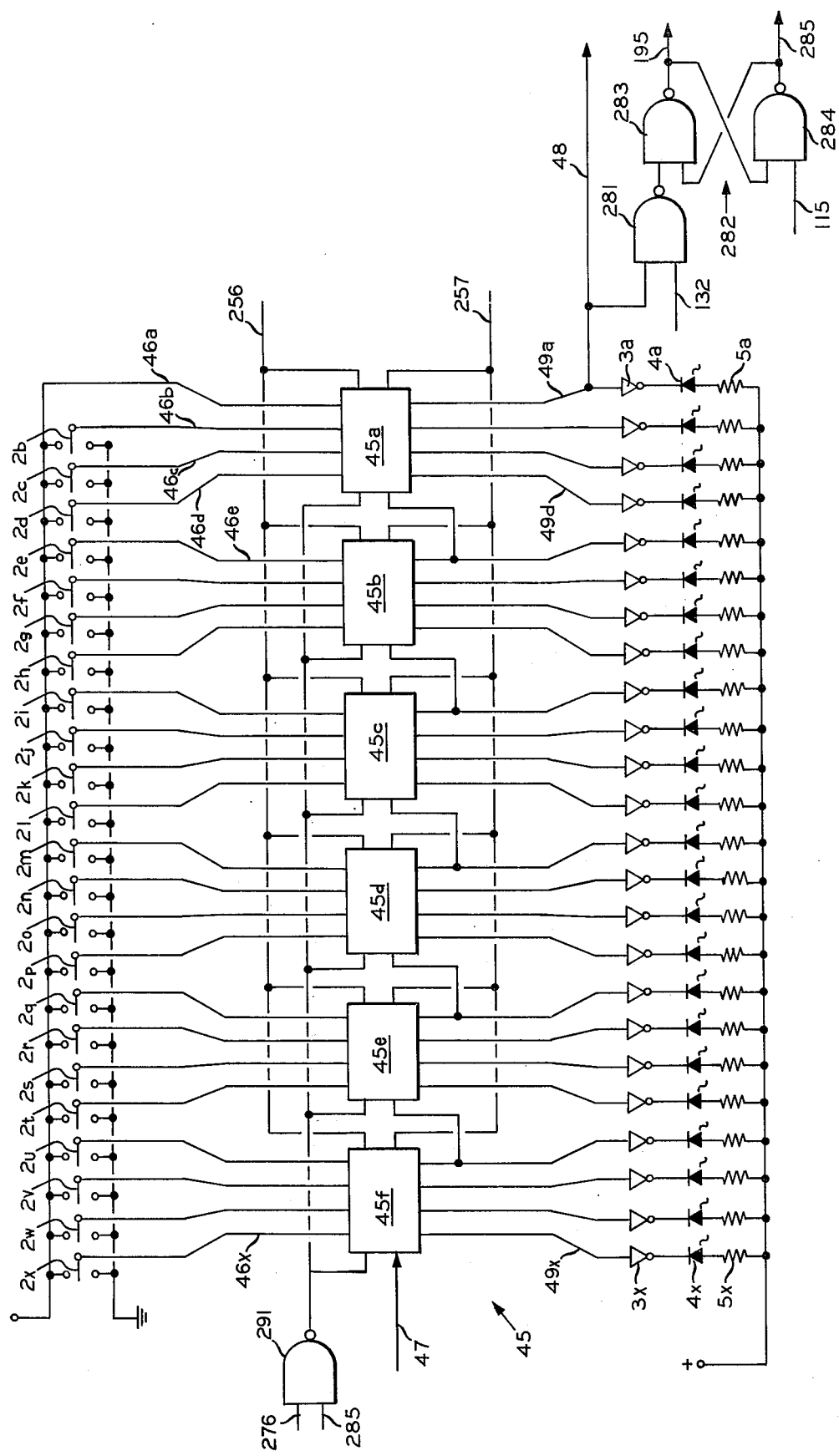
Figure 10:
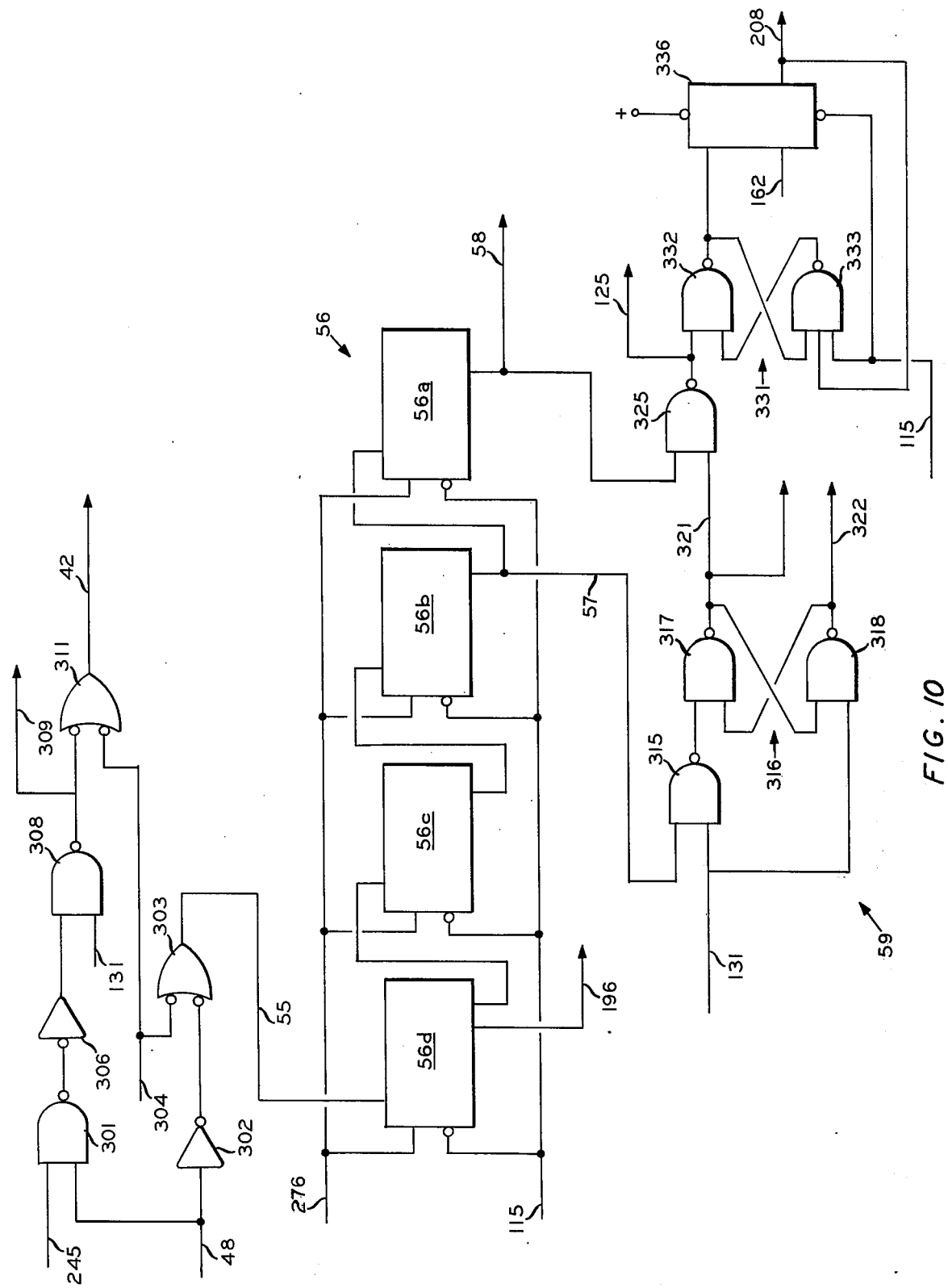

A NAND circuit 194 requires the presence of three logic one inputs for the generation of a logic zero restart signal 133. These three signals are a clock phase sixteen φ16 signal, a message received signal 195, and an error code received signal 196. The generation of a phase sixteen φ16 signal is illustrated by FIG. 7, the generation of the message received signal 195 is illustrated by FIG. 9, and the generation of the error code received signal 196 is illustrated by FIG. 10. Since all three signals are not generated until both the return message and its associated error code are received from the remote unit, however, the restart signal will always be a logic one during the receipt of a message and error code from the remote unit.

Utilizing the logic one restart signal 133 and the output of the NAND circuit 188 as inputs, a NAND circuit 197 and an inverter 198 combine to pass the output of the NAND circuit 188 to the input terminal of a NAND circuit 202. The NAND circuit 202 comprises one half of a flip-flop 201. The other NAND circuit 203 of the flip-flop 201 receives its external input from the output of the inverter 182 through an inverter 204. Prior to receipt of a message from the remote unit, therefore, the logic zero state of the phase eight $\phi 8$ signal will cause a logic one to be present at the outside input of the NAND circuit 202 and, as the synchronization pulse of the return message from the remote unit is delivered from the inverter 182 to the serial input terminal 47 of the shift register 45, the synchronization pulse will also be delivered to the inverter 204 where it will be inverted to present a logic zero input to one terminal of the NAND circuit 203, thereby forcing a logic one output from the NAND circuit 203. In this condition the output of the NAND circuit 202 will be a logic zero which is provided to the input of a NAND circuit 167 for initiating passage of the oscillator source signal 162 as an oscillator signal 161.

If the logic one synchronization signal is present without interruption for a period of time sufficient to permit a phase eight $\phi 8$ signal to be generated, the presence of a logic one input at both terminals of the NAND circuit 184 will cause the output thereof to become a logic zero, thereby resetting the flip-flop 190 so that the output of the NAND circuit 192 associated therewith becomes a logic zero and insuring a continued logic one output from the NAND circuit 188 until a logic zero general reset signal 115 is received. If, however, the logic one input received at the serial input line 43 is of insufficient duration to qualify as a synchronization signal, the presence of a logic zero from the output of the NAND circuit 178 at one terminal of the NAND circuit 184 will prevent the appearance of a phase eight $\phi 8$ signal from changing the state of the flip-flop 190. In addition, the presence of two logic one inputs to the NAND circuit 186 when the phase eight $\phi 8$ logic one signal is generated will cause a logic one signal to be present at the input terminal of the NAND circuit 188 connected to the output of the inverter 187, thereby causing the output of the NAND circuit 188 to be zero which will, in turn, result in a logic zero input to one terminal of the NAND circuit 202 changing the state of the flip-flop 201 and halting transmission of the oscillator signal 161.

When the self-test switch 171 is switched to its grounded position to provide a logic zero input to the inverter 175 and to one input of the NAND circuit 176, the passage of any data arriving at the serial input lead 43 of the tester is inhibited by the output of the NAND circuit 176 being forced to a continuing logic one. In this condition the inverter 175 and the NAND circuit 176 each provide a logic one signal to one input of NAND circuits 177 and 178 respectively, thereby permitting passage of binary data from the other input terminal of NAND circuit 177 through NAND circuits 177 and 178. In this aspect of their operation the switch 171 and resistor 172 associated therewith in conjunction with the inverter 175 and NAND circuits 176, 177, and 178 perform the function of the switch means 67 illustrated by FIG. 4.

A flip-flop 206 is reset at the start of each test operation by the general reset signal 15 so that the output thereof to an input of the NAND circuit 177 is a logic zero. The data input terminal of the flip-flop 206 is connected to the serial output lead 58 of the shift register 56. The output of a NAND circuit 207 is utilized as the clock input to the flip-flop 206. The two inputs to the NAND circuit 207 include a loop enable signal 208 and a phase fifteen $\phi 15$ clock signal which has been inverted by an inverter 209. In the presence of a logic one loop enable signal 208 each logic one phase fifteen $\phi 15$ clock signal is transmitted through the inverter 209 and the NAND circuit 207 to the clock input of the flip-flop 206 causing the data available from the shift register 56 through its serial output terminal 58 to be transmitted from the output of the flip-flop 206 through NAND circuits 177 and 178 to the output of the NAND circuit 178 where the data is utilized and treated in the same manner as a message received from a remote unit.

One suitable device which may be utilized as the flip-flop 206 is one half of a model MM 74C74 dual D flip-flop manufactured by the National Semiconductor Corporation of Santa Clara, Calif. When such a device is used, pin 11 is connected to the output of the NAND circuit 207; pin 12 is connected to lead 58; pin 10 is connected to a logic one voltage source; pin 13 is connected to the general reset signal 115; and pin 9 is connected to an input of the NAND circuit 177.

FIG. 7 illustrates the apparatus and method by which the various clock pulses which control the operation of the preferred tester 41 can be generated. A ring counter 221 can be constructed by any suitable means known in the art such as, for example, by utilizing two 8-bit shift registers 222 and 223 to provide the desired 16-phase clock. Although the use of a clock as described having 16 clock phases is preferred for use with the preferred tester embodiment, the use of other clock pulse generating means having differing numbers of phases and differing construction are within the scope of the invention. When operation of the tester 41 is initiated, the general reset signal 115 is utilized to reset all data locations within the shift registers 222 and 223 to a logic zero condition. At the same time a logic one general reset signal 112 is applied to one input of a NOR circuit 225, thereby forcing the output thereof to a logic zero. A flip-flop circuit 227 comprising a pair of NAND circuits 228 and 229 produces a logic one output signal from the output of the NAND circuit 228 whenever the NOR circuit 225 provides a logic zero input thereto. The output of the NOR circuit 228 is provided to the input of the phase can $\phi 1$ location of the ring counter 221 so that each oscillation of the oscillator signal 161 which is applied to the clock inputs of the ring counters 222 and 223 will shift the ring counter phase one $\phi 1$ condition to the same state as the NAND circuit 228 output. As soon as the phase one $\phi 1$ output of the ring counter 221 becomes a logic one as a result of the NAND circuit 228 having a logic one output, an inverter 231 using the phase one $\phi 1$ signal as an input provides a logic zero signal to an input of the NAND circuit 229, thereby reversing the state of the flip-flop 227 and once more providing a logic zero output for the NAND circuit 228 until the NOR circuit 225 delivers another logic zero signal. Succeeding oscillations of the oscillator signal 161 shift the logic one data state through succeeding data locations of the shift register 222, from the last data location of the shift register 222 to the first data location of shift register 223 and through the succeeding data locations of the shift register 223. The output of the last data location of the shift register 223 is connected to an input of the NOR circuit 225 so that when the logic one data state has been shifted to the last data location of the shift register 223 by the sixteenth oscillation of the oscillator signal 161 a logic one will be reinserted into the first data location of the shift register 222 from the flip-flop 227 by the seventeenth oscillation of the oscillator signal 161. Operation of the ring counter 221 in this manner continues until the oscillator signal 161 is no longer delivered to the ring counter 221. Since a logic one signal appears at each of the phase outputs $\phi 1-\phi 16$ of the ring counter 221 in a predetermined sequence and at a predetermined interval based on the frequency of the oscillator signal 161, the presence of a logic one signal at any of the 16 outputs $\phi 1-\phi 16$ of the ring counter 221 can be used to sequentially control the operation of various functions of the tester 41.

Suitable shift registers which can be utilized as shift register means 222 or 223 of the ring counter 221 are Model MM74C164 8-bit parallelout serial shift registers manufactured by the National Semiconductor Corporation, Santa Clara, California. When two such shift registers are utilized as shift registers 232 and 223 respectively, terminals 1 and 2 of the shift register 222 are connected to the output of the NAND circuit 228; terminals 3, 4, 5, 6, 10, 11, 12, and 13 are utilized as phase outputs $\phi 1$, $\phi 2$, $\phi 3$, $\phi 4$, $\phi 5$, $\phi 6$, $\phi 7$, and $\phi 8$ respectively; terminal 13 of the shift register 222 is connected to terminals 1 and 2 of the shift register 223; terminals 3, 4, 5, 6, 10, 11, 12, and 13 of the shift register 223 are utilized as phase outputs $\phi 9$, $\phi 10$, $\phi 11$, $\phi 12$, $\phi 13$, $\phi 14$, $\phi 15$, and $\phi 16$ respectively; terminal 8 of each of the shift registers is connected to the oscillator signal 161; and terminal 9 of each of the shift registers is connected to the general reset signal 115.

Figure 8:
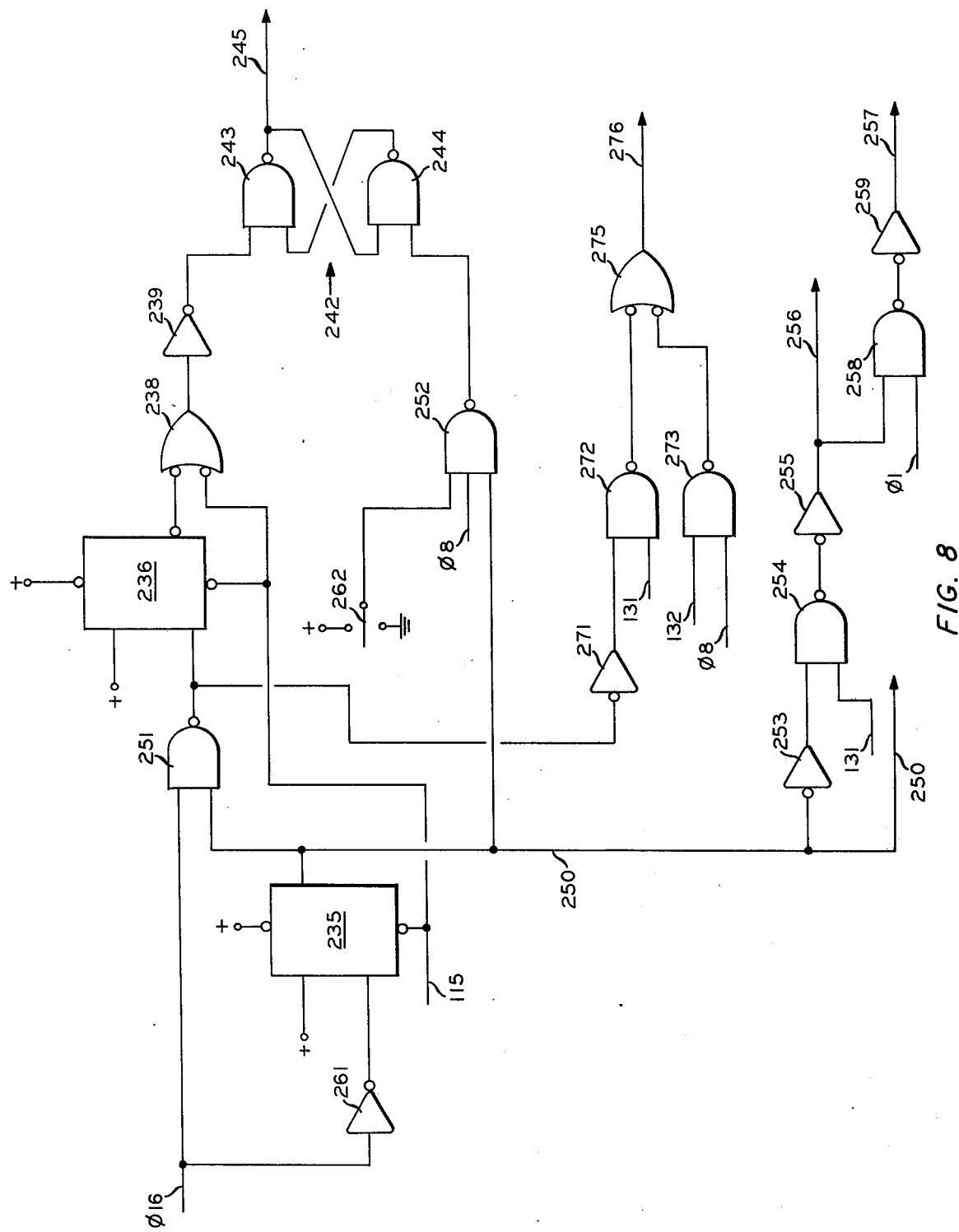

FIG. 8 illustrates the apparatus and method by which clock pulses from the ring counter 221 are utilized to initiate and synchronize the operation of the tester 41. At the time operation of the tester initiated the general reset signal 115 is utilized to reset flip-flops 235 and 236 so that the output of flip-flop 235 is a logic zero and the output of the flip-flop 236 is a logic one. The general reset logic zero signal 115 used to reset the flip-flops 235 and 236 is also provided to an input of a NAND circuit 238, forcing the output thereof to be a logic one. An inverter 239 inverts the output of the NAND circuit 238 and a flip-flop 242 having NAND circuits 243 and 244 associated therewith is reset to provide a logic one data gate signal 245 as the output of the NAND circuit 243 to which the inverter 239 has applied a logic zero input.

The output of the flip-flop 235 is utilized as an enable signal 250. In the reset state immediately following application of a logic zero general reset signal 115 the logic zero enable signal 250 is applied to a NAND circuit 251, a 3-input NAND circuit 252, and an inverter 253, causing the output of each of these elements to be a logic one. A NAND circuit 254 accepts the output of the inverter 253 and the transmit signal 131 as inputs thereto. As soon as the transmit signal 131 is generated by the apparatus and method illustrated in FIG. 5, the output of the NAND circuit 254 becomes a logic zero with an inverter 255 providing a logic one parallel load signal 256 to the shift register 45. At substantially the same time the transmit signal 132 applied to the NAND circuit 167 of FIG. 6 actuates the oscillator signal 161 and, upon the receipt of a phase one $\phi 1$ signal from the clock of FIG. 7, a NAND circuit 258 in conjunction with an inverter 259 utilizes the logic one parallel load signal 256 and the logic one $\phi 1$ signal to produce a logic one parallel clock signal 257.

The first logic one phase sixteen $\phi 16$ signal delivered by the ring counter 221 is applied to an inverter 261 and to one input of the NAND circuit 251. The presence of a logic zero enable signal 250 at the other input of the NAND circuit 251 prevents the first phase sixteen $\phi 16$ signal from having any effect on the flip-flop 236. Until the arrival of the first logic one phase sixteen $\phi 16$ pulse the output of the inverter 261 is a logic one in response to the logic zero input thereto. The continuing presence of a logic one signal applied to the clock input of the flip-flop 235 does not alter the output state of the flip-flop, however, since the data state of the data input to the flip-flop 235 is transferred to the output thereof only on a change from a logic zero to a logic one at the clock input thereto. When the first phase sixteen $\phi 16$ pulse has passed and the input to the inverter 261 again becomes a logic zero the output of the inverter 261 changes from a logic zero to a logic one and, since the data input signal to the flip-flop 235 is permanently connected to a positive logic one voltage source, the enable signal 250 becomes a logic one and is maintained in that state until a subsequent general reset signal 115 is applied to its reset terminal. The first phase sixteen $\phi 16$ pulse from the clock therefore changes the output state of the flip-flop 235 and, in so doing, terminates the logic one state of the parallel load signal 256 and the parallel clock signal 257. The presence of a logic one enable signal 250 at one of the three terminals of a NAND circuit 252 does not cause a change in output state of the NAND circuit 252 at this time since the presentation of a logic one to the NAND circuit 252 by the enable signal 250, a phase eight $\phi 8$ signal, and a synchronization format switch 262 are all required in order to produce other than a logic one output therefrom.

Prior to the generation of a second logic one phase sixteen $\phi 16$ signal the output of the NAND circuit 251 is maintained at a logic one state by one of its inputs being held in a logic zero state. In this condition an inverter 271 provides a logic zero input to a NAND circuit 272 causing the output thereof to be a logic one. The transmit signal 131 is provided as the other input signal to the NAND circuit 272. A NAND circuit 273 utilizes the transmit signal 132 and the phase eight $\phi 8$ signal as inputs thereto. The outputs of NAND circuits 272 and 273 are provided as the two inputs to a NAND circuit 275 which delivers a gated clock signal 276 as the output thereof. Since either the transmit signal 131 or the transmit signal 132 will be a zero, the NAND circuit 272 will deliver a logic one input to the NAND circuit 275 when transmission of a message and error code to the remote unit are complete, and the NAND circuit 273 will deliver a logic one input to the NAND circuit 275 during transmission of a message and error code to the remote unit. The gated clock signal 276 will therefore be the same as the output of the inverter 271 during message and error code transmission by the tester 41, and the gated clock signal 276 will be the same as the phase eight $\phi 8$ signal during the reception of a return message and error code from a remote unit.

Following the general reset signal 115 which caused the data gate signal 245 to be set to a logic one state, return of the general reset signal 115 to a positive state caused the output of the NAND circuit 238 to become a logic zero, thereby applying a logic one to the external input of the NAND circuit 243 through the inverter 239. In the absence of any change in the output of the NAND circuit 252, however, the data gate signal 245 remains unchanged. When the switch 262 is connected to a logic one positive voltage source, the first logic one phase eight φ8 signal following the first logic one phase sixteen φ16 signal will cause the output of the NAND circuit 252 to become a logic zero. In this condition the logic zero applied to an input terminal of the NAND circuit 244 and the logic one input provided by the inverter 239 to the NAND circuit 243 will cause the data gate signal 245 to change from a logic one to a logic zero where it will remain until the output of the flip-flop 236 becomes a logic zero. Placing the switch 262 in a position wherein it provides a logic one input to the NAND circuit 252 therefore provides for an initial data gate signal 245 duration equal to one and one-half complete cycles of the ring counter 221. If the switch 262 is utilized to ground one input to the NAND circuit 252, the output in the NAND circuit 252 will always be a logic one and the condition of the data gate signal 245 will remain unchanged.

The arrival of a second logic one phase sixteen φ16 signal, combined with the continuing presence of the logic one enable signal 250, causes the output of the NAND circuit 251 to become a logic zero, thereby causing a logic one clock signal 276 of the same duration as the phase sixteen φ16 signal pulse to be delivered from the output of the NAND circuit 275 via the inverter 271 and NAND circuit 272 previously described. At the end of this second logic one phase sixteen φ16 pulse the phase sixteen φ16 signal returns to a logic zero and the output of the NAND circuit 251 returns to a logic one. Since the output of the NAND circuit 251 is connected to a clock terminal of the flip-flop 236 which causes the flip-flop to be triggered by a change from a logic zero to a logic one the output of the flip-flop 236 is changed from a logic one to a logic zero at the end of the secnd phase sixteen φ16 pulse since the end of the pulse will cause the output of the flip-flop 236 to assume the opposite logic state from the data input terminal of the flip-flop which has been permanently connected to a logic one voltage source. A logic zero output from the flip-flop 236 will cause a logic one data gate signal 245 to be maintained until the general reset signal 115 is again applied to the reset terminal of the flip-flop 236.

Generation of the data gate signal 245 and the gated clock signal 276 to the method described during the first two cycles of the ring counter 221 causes an initial synchronizaton signal having a duration of either one and one-half ring counter cycles or two ring counter cycles, depending upon the position of the switch 262. The switch 262 is used to provide a continuing logic one input to the NAND circuit 252 when transmission of a half duplex synchronization pulse is required and is used to provide a continuing logic zero input to the NAND circuit 252 when transmission of a full duplex synchronization pulse is required. During subsequent operation of the apparatus, each phase sixteen φ16 signal generates a corresponding gated clock signal 276, but the state of the flip-flops 235 and 236 as well as the data gate signal 245, the parallel load signal 256, and the parallel clock signal 257 remain unchanged.

Although any suitable flip-flop circuits can be utilized as flip-flops 235 and 236, circuits which are well suited for use in the illustrated apparatus can be a Model MM74C74 dual D flip-flop manufactured by the National Semiconductor Corporation of Santa Clara, California. When such a device is used as the flip-flops 235 and 236 terminals 2, 4, 10, and 12 are connected to a positive logic one voltage source; terminals 11 is connected to the output of the inverter 261; terminals 1 and 13 are connected to the general reset signal 115; terminal 9 is utilized as the source of the enable signal 250; terminal 3 is connected to the output of the NAND circuit 251; and terminal 6 is utilized as the output of the flip-flop circuit 236 and is connected to an input of the NAND circuit 238.

FIG. 9 illustrates a preferred embodiment of the main shift register 45 of the tester 41 along with associated input, output, and detection apparatus. The preferred shift register 45 illustrated has 24 data locations and can be constructed from six 4-bit shift registers 45a–45f which are connected in series to operate as a single 24-bit shift register. Each of the 24 data locations within the shift register 45 has associated therewith a parallel input mans 46a–46x. A plurality of switch means 2b–2x are associated with parallel input means 46b –46x respectively for providing either a grounded logic zero or a positive voltage logic one to each of the parallel input leads 46b–46x. The parallel input lead 46a is permanently connected to a logic one voltage source so that the first bit of information shifted from the shift register 45 will always be a logic one synchronization pulse. Upon receipt of both a logic one parallel load signal 256 and a logic one parallel clock signal 257 the logic state of each respective parallel input line 46a–46x is loaded into its respective data location within the shift register 45.

A plurality of parallel outlet leads 49a –49x, associated with the shift register data locations receiving information from parallel input leads 46a-46x respectively, assume the same data state as their respective shift register location. The parallel output line 49a is also utilized as the serial output line 48 of the shift register 45. The serial output lead 48 of the shift register 45 and the transmit signal 132 are provided as inputs to a NAND circuit 281. A flip-flop 282 has two NAND circuits 283 and 284 associated therewith. The output of the NAND circuit 281 is connected to an input of the NAND circuit 283 and the general reset signal 115 is provided as an input to the NAND circuit 284. The flip-flop 282 generates as outputs thereof the message received signal 195 from the output of the NAND circuit 283 and a message received signal 285 from the output of the NAND circuit 284. As operation of the tester is initiated, the logic zero general reset signal 115 and the logic zero transmit signal 132 which are produced cause a logic zero to be applied to one input of the NAND circuit 284 and a logic one to be applied to one input of the NAND circuit 283, thereby causing generation of a logic zero message received signal 195 and a logic one message received signal 285. Even through the general reset signal 115 returns to a logic one state as operation of the tester begins, the message received signal 195 and the message received signal 285 will remain in their reset condition until a logic one is applied to both inputs of the NAND circuit 281.

A NAND circuit 291 receives as inputs thereto the gated clock signal 276 and the message received signal 285. The logic one state of the message received signal 285 permits the output of the NAND circuit 291 to change each time the logic state of the gated clock signal 276 changes. The output of the NAND circuit 291 is utilized to initiate and control shifting of data information through successive locations within the shift register 45 to the serial output line 48. During the shifting of data from the shift register 45 the serial input terminal 47 of the shift register 45 is maintained at a logic zero state by the logic zero transmit signal applied to the NAND circuit 181 illustrated in FIG. 6 so that as data is shifted from the shift register 45 the vacated data locations are maintained in a logic zero state.

On completion of transmission of the message and error code to the remote unit 21 the transmit signal 132 changes to a logic one state. This change does not alter the output of the NAND circuit 281 since all data locations within the shift register 45, including the location associated with lead 49a, contain a logic zero at that time. As a message beginning with a logic one synchronization pulse is received from the remote unit and provided to the serial input 47 of the shift register 45 as illustrated by FIG. 6, and the gated clock signal 276 is delivered in response to each phase eight $\phi 8$ of the ring counter 221 by means of the NAND circuits 272, 273, and 275 as illustrated in FIG. 8, the output signal of the NAND circuit 291 is utilized in response to the gated clock signal 276 to shift each arriving data bit into the shift register 45 at the location associated with the parallel output lead 49x and through successive shift register data locations until 24 data bits have been received and shifted into the shift register 45. When the 24th data bit is received at the location associated with the parallel output line 49x, the logic one synchronization bit has been shifted to the shift register location associated with the parallel output line 49a and appears on the serial output line 48 of the shift register 45. The presence of this logic one signal along with the logic one state of the transmit signal 132 causes the NAND circuit 281 to deliver a logic zero input to the NAND circuit 283 which, combined with the logic one input to the NAND circuit 284 provided by the general reset signal 115 causes the state of the flip-flop 282 to reverse, generating a logic one message received signal 195 and a logic zero message received signal 285. The presence of a logic zero message received signal 285 at the input of the NAND circuit 291 inhibits further gated clock pulse 276 from being applied to the shift register 45 and the 24-bit message received from the remote unit is retained undisturbed in the shift register 45.

Up until the time that the complete return message is received from the remote unit, the parallel ouput lines 49a–49x associated with the shift register 45, while they can be used for logic and control purposes, are of relatively little value for visual display purposes since the speed with which the shift register contents are initially shifted out leaving each shift register data location in a logic zero state and the speed with which the return message is shifted into the shift register 45 are ordinarily much too fast to permit visual perception of the operations. When the return message from the remote unit 41 has been received and the clock pulse to the shift register 45 has been inhibited, visual display of shift register contents can be utilized to compare the received message with the desired remote unit response. For this purpose an inverter 3a–3x, a light-emitting diode 4a-4x, and a load resistor 5a-5x are connected to each respective parallel output line 49a–49x. When a logic one appears in any of the data locations within the shift register 45, its associated inverter 3a–3x will provide a logic zero or grounded signal to the cathode of the associated light emitting diode 4a-4x thereby causing current to flow from a position voltage source connected to one end of each load resistor 5a–5x and through the respective load resistor 5a–5x and the respective light-emitting diode 4a–4x to ground, thereby causing light to be emitted from the light-emitting diode. When a data location within the shift register 45 is in the logic zero state and a logic zero signal is delivered by the respective parallel output line 49a-49x to its associated inverter 3a–3x, the inverter raises the cathode of the associated light-emitting diode 4a–4x to the same level as the logic one positive voltage applied to the other end of the light-emitting diode and load resistor combination thereby precluding the flow of current through and emission of light by the respective light-emitting diode 4a-4x.

In a typical application of the shift register 45 and its associated circuit elements an operator might manually set switches 2b–2g to designate a remote unit code which will designate a particular remote unit to be tested, arrange switches 2h–2k to designate a particular channel within the designated remote unit, set switches 2l–2n to specify an operation to be performed by the designated remote unit and channel, and set switches 2o—2x to provide required data to the remote unit to designte specific data which is requested from the remote unit. A typical answer from the remote unit might repeat the remote unit code and channel code then transmit the requested data or, in the case where no return information was requested in the command message formulated by the operator, might return the entire test message to indicate that the messaage had been received and the requested operation had been accomplished.

Although any suitable shift register means 45 can be utilized in conjunction with the apparatus and method of the invention, a shift register of the type illustrated having six 4-bit shift register components 45a–45f can be constructed using 6 Model MM74C95 4-bit right-shift left-shift registers manufactured by the National Semiconductor Corporation of Santa Clara, California. When six of these devices are used as shift register constitutents 45a-45f, the No. 6 terminal of each of the devices is connected to the parallel load signal 256, the No. 8 terminal of each device is connected to the parallel clock signal 257, and the No. 7 terminal of each device is connected to the output of the NAND circuit 291. Terminal No. 9 of the 45a device is utilized a the parallel output 49a and serial output 48 of the shift register 45 with the No. 9 terminal of device 45b being connected to the No. 1 terminal of 45a, the No. 9 terminal of 45c connected to the No. 1 terminal of 45b, the No. 9 terminal of 45d connected to the No. 1 terminal of 45c, the No. 9 terminal of 45e connected to the No. 1 terminal of 45d, the No. 9 terminal of 45f connected to the No. 1 terminal of 45e, and the serial input line 47 being connected to the No. 1 terminal of the 45f device. The parallel input lines 4a-4d are connected to terminals 5, 3, 2, and 14 respectively of device 45a with the comparable terminals 5, 3, 2, and 14 of each of the other devices being connected to respective parallel input lines in ascending alphabetical order through and including terminals 5, 3, 2, and 14 of device 45f which are connected to parallel input lines 46u, 46v, 46w, and 46x respectively. The parallel output lines 49a–49x are connected in a similar manner with terminals 9, 10, 12, and 13 of device 45a serving parallel output lines 49a, 49b, 49c, and 49d respectively and terminal 9, 10, 12, and 13 of the other shift register units being connected in a similar manner concluding with terminals 9, 10, 12, and 13 of device 45f which are connected to parallel output lines 49u, 49v, 49w, and 49x respectively.

FIG. 10 illustrates the apparatus and method by which operation of the shift register 56 and its associated equipment is accomplished. The series output line 48 of the shift register 45 is connected to one input terminal of a NAND circuit 301 and to an inverter 302. The output of the inverter 302 is connected to one input of a NAND circuit 303. The other input to the NAND circuit 303 is connected to an inverted output signal 304 from the error code generator 62. During the time that data is being shifted from the shift register 45 to the serial output line 48 thereof signal 304 will be a logic one thereby causing the data supplied to the inverter 302 by the serial output line 48 of the shift register 45 to be applied to the serial input line 55 of the shift register 56.

The presence of a logic one input to the second terminal of the NAND circuit 301 in the form of the data gate signal 245, which is generated as illustrated by FIG. 8, permits the NAND circuit 301 and the inverter 306 to which the output of the NAND circuit 301 is connected to deliver an output signal from the inverter 306 which is the same as the signal appearing at the serial output line 48 of the shift register 45. The output of the inverter 306 and the transmit signal 131 are applied as inputs to a NAND gate 308. Since the transmit signal 131 is a logic one while transmission from the shift register 45 is taking place, the output thereof is a serial output signal 309. With the signal 309 and the continuing logic one signal 304 as inputs, a NAND circuit 311 inverts the serial output signal 309 to generate the serial output signal 42 which is delivered to the remote unit 21.

The shift register 56 can be any suitable shift register having a number of data locations equal to the number of data locations in the shift register 45 plus the number of data bits in the error code to be generated by the error code generator 62. Since the shift register 45 of the preferred embodiment has 24 data locations and the error code generated by the preferred error code generator 62 comprises seven bits of information, the shift register 56 illustrated comprises 31 data locations. Although the shift register 56 can be constructed in any suitable manner, a preferred method illustrated is the connection of four 8-bit shift registers combined to provide a possible total of 32 shift register data locations with one data location of one of the 8-bit shift registers being unused.

At the initiation of tester operation the reset signal 115 is applied to a reset terminal of each of the register constituents 56a–56d to set all shift register locations to a logic zero data state. Data arriving from the serial output line 48 of the shift register 45 to the serial input line 55 of the shift register 56 as hereinbefore described in clocked into and through the shift register 56 by the gated clock signal 276. As the 24th data bit is shifted into the shift register 56, the logic one synchronization bit leading the data message is delivered, by the parallel output line 57 associated with the data location in which it is stored, to a detecting means 59 comprising a NAND circuit 315 and a flip-flop 316. The flip-flop 316 has associated therewith two NAND circuits 317 and 318. The parallel output signal 57 and the transmit signal 131 are utilized as inputs to the NAND circuit 315. With a continuing logic one transmit signal 131 present, the output of the NAND circuit 315 changes from a logic one to a logic zero as soon as a logic one output signal 57 is delivered. The logic zero provided by the output of the NAND circuit 315 to the input of the NAND circuit 317 causes the output of the NAND circuit 317 to produce a logic one last bit signal 321. Using the transmit signal 131 and the last bit signal 321 as inputs, the NAND circuit 318 produces a logic zero last bit signal 322. Receipt of the last bit signal 321 by the error code generator 62 causes the error code generator 62 to transmit the error code which it has generated in response to the transmitted data message. In inverted error code signal 304 is reinverted and delivered at the output of NAND circuits 311 and 303 so the the error code is delivered to the serial input line 55 of the shift register 56 and to the serial output 42 for transmission to the remote unit 21. The error code appears as the output of NAND circuits 303 and 311 since all data has been removed from the shift register 45 leaving its contents uniformly at a logic zero state and thereby maintaining the output of the inverter 302 and signal 309 at a logic one state. The error code is shifted into the shift register 56 by the operation of the gated clock signal 276. As the seventh data code bit is clocked into the shift register 56 the logic one synchronization bit of the message arrives at the serial output line 58 of the shift register 56. A NAND circuit 325 utilizes the last bit signal 321 and the serial output line 58 as inputs and, in response to the presence of a logic one last bit signal 321 and the change of the serial output line 58 from a logic zero state to a logic one state changes its output end transmission signal 125 from a logic one to a logic zero, thereby initiating action as illustrated in FIG. 5 which halts transmission of data from the tester 41 and prepares the tester for receipt of a return message from the remote unit 21.

A flip-flop 331 having a 2-input NAND circuit 332 and a 3-input NAND circuit 333 is initialized by the logic zero general reset signal 115 applied to an input of the NAND circuit 333 and the logic one end transmission signal present due to the initial logic zero data state within the shift register 56 location connected to the serial output line 58 thereof. In this reset state the output of the NAND circuit 332 is a logic zero. A flip-flop 336 is also reset by the general reset signal 115 so that its output is a logic one. The clock input to the flip-flop 336 is connected to the oscillator signal 162 but as long as the output of the NAND circuit 332 connected to the data input of the flip-flop 333 remains a logic zero a continuing logic one signal is generated as the loop enable output signal 208 of the flip-flop 336. With the generation of a logic state zero end transmission signal 125 the output of the NAND circuit 332 provides a logic one input signal to the data input of the flip-flop 336 and the next oscillation of the oscillator source signal 162 causes the loop enable signal 208 to become a logic zero. Since the loop enable signal 208 is provided as the third input to the NAND circuit 333, its presence will immediately reset the flip-flop 331 causing the output of the NAND circuit 332 to return to a logic zero state. The effect of the flip-flop 331 and the flip-flop 336 is to create a single logic zero pulse loop enable signal 208 each time an end transmission signal 125 is generated. This loop enable pulse signal 208 is utilized in place of the phase fifteen φ15 signal to pulse the clock input of the flip-flop 206 (FIG. 6) and initiate data looping when a loop mode has been selected by switch 171. Initiating data looping in this manner is necessary since the ring contour is stopped in response to said end transmission signal 125 regardless of the position of the switch 171.

When the self-test switch 171 (FIG. 6) is used to ground the inputs of the inverter 175 and NAND circuit 176, the content of the shift register 56 is shifted from the serial output terminal 58 thereof to the input circuit of the tester 41 and is received in the same manner that a return message from the remote unit 21 would be received. During reception of a return message from the remote unit 21 or a looped message in the self-test mode, the main shift register 45 ceases operation after the first 24 data bits have been received as discussed in conjunction with the description of FIG. 9. Continuing operation of the error code generator 62 and the error code detector 71 is necessary after the message portion of the transmission from the remote unit 21 is received in order to detect any error which may exist in the transmission. Since the error code transmitted from the remote unit contains 7 data bits and therefore requires seven additional clock pulses to receive, the continuing synchronization pulse logic one data state provided to the serial output line 48 of the shift register 45 causes a logic one to be shifted into the shift register 56 behind the 24 zeros which were received as the main shift register 45 was filled with message data. When seven such logic ones have been gated into the shift register 56 causing the seventh data location from the serial input line 55 thereof to deliver a logic one signal to a parallel output line associated therewith, the parallel output line delivers a logic one error code received signal 196. The presence of a logic one message received signal 195 and a logic one error code received signal 196 as inputs to the NAND gate 194 of FIG. 6 results in the generation by the next logic one phase sixteen $\phi$16 pulse of a logic zero restart signal 133 as the output of the NAND gate 194, thereby applying a logic zero signal to one input of the NAND gate 197 and halting operation of the tester 41 by inhibiting generation of the oscillator signal 161.

Suitable 8-bit shift registers 56a –56d which can be utilized to construct the shift register 56 are Model MM74C164 8-bit parallel-out serial shift registers manufactured by the National Semiconductor Corporation of Santa Clara, Cal. When such elements are used, pin No. 9 of each shift register is connected to the general reset signal 115, and pin No. 8 of each circuit is connected to the gated clock signal 276. Pin 12 of the device 56a is connected to the series output line 58; pin 13 of the device 56b is connected to pins 1 and 2 of the device 56a; pin 13 of the device 56c is connected to pins 1 and 2 of the device 56b; pin 13 of the device 56d is connected to pins 1 and 2 of the device 56c; pins 1 and 2 of the device 56d are connected to the serial input line 55; pin 12 of the device 56d is utilized as the source of the error code received signal 196; and pin 13 of the device 56b is connected to the parallel output line 57.

A suitable flip-flop which can be utilized as the flip-flop 336 can be one-half of a Model MM74C74 dual D flip-flop manufactured by the National Semiconductor Corporation of Santa Clara, Calf. When such a device is utilized as a flip-flop 336, pin 11 thereof is connected to the oscillator source signal 162; pin 12 is connected to the output of the NAND circuit 332, pin 13 is connected to the general reset signal 115; pin 10 is connected to a logic one voltage source; and pin 8 is the source of the loop enable signal 208.

Figure 11:
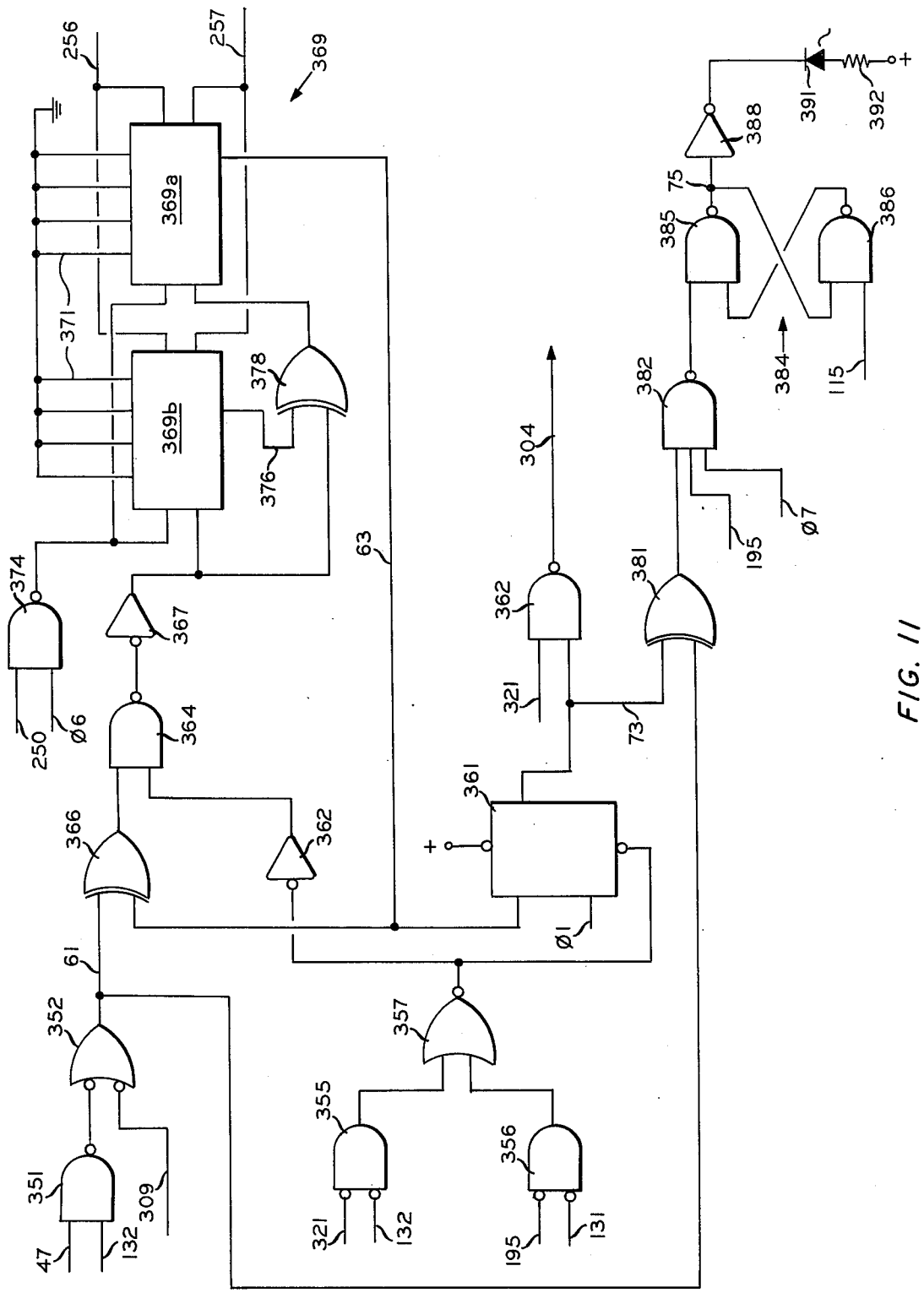

FIG. 11 illustrates the apparatus and method for generating an error code signal and comparing generated and transmitted error code signals to detect a transmission error. A NAND circuit 351 has one input connected to the serial input line 47 of the shift register 45 and one input connected to the transmit signal 132. When data is being received by the shift register 45 from the shift register 56 or from a remote unit 21 and the transmit signal 132 is in a logic one state, the data received at the serial input line 47 will appear at the output of the NAND circuit 351 in an inverted form. During transmission of a message from the shift register 45 when the transmit signal is a logic zero, the output of the NAND gate 351 will deliver a logic one signal to the input of a NAND gate 352. In a similar manner, the NAND gate 308 of FIG. 10 will deliver an inverter serial output signal 309 when a message is being transmitted from the shift register 45 and will deliver a constant logic one signal 309 when a message is being received by the shift register 45. The serial input line 61 of the error code generator 62 therefore always receives a signal which is the same as the serial input signal 47 to the shift register 45 when the shift register 45 is receiving a message, and always receives data which is the same as the data transmitted from the serial output 42 when the tester 41 is transmitting a message to a remote unit 21 and/or the shift register 56.

A NOR circuit 355 which utilizes the last bit signal 321 and the transmit signal 132 as inputs thereto delivers a logic one output from the time that transmission of a message from the shift register 45 has begun until the time that a logic one last bit signal 321 is generated when the message portion of the transmission to the remote unit has been completed. At all other times the output of the NOR circuit 355 is a logic zero. In a similar manner the NOR circuit 356 utilizing the message received signal 195 and the transmit signal 131 as inputs thereto generates a logic one output during the time that a message is being received by the shift register 45 up until the time that all 24 bits of the message portion of the received signal have been shifted into the shift register 45. At all other times the output of the NOR circuit 356 is a logic one.

A NOR circuit 357 utilizes the outputs of the NOR circuits 355 and 356 as input thereto and delivers a logic zero output whenever either of the outputs of NOR circuits 355 or 356 is a logic one. A logic zero output from the NOR circuit 357 maintains a flip-flop 361 in a continuing reset set and locks the output thereof, which is connected to the input line 73 of the error detector 71 and to an input of a NAND circuit 362, in a logic zero condition. In addition, application of the last bit signal 321 as the second input to the NAND circuit 362 blocks the transmission of any inverted error code signal 304 prior to the transmission of the message portion of a signal to a remote unit 21. A logic zero provided by the output of the NOR circuit 357 to an inverter 362 maintains one input of a NAND circuit 364 at a logic one state, thereby permitting the output of an exclusive OR gate 366 to be passed through the NAND gate 364 and an inverter 367 to the input of a shift register 369.

The shift register 369 can be any 7-bit shift register suitable for use in generating an error code as described and may be either a single shift register or a combination of two or more shift registers 369a and 269b which have been combined to provide at least the requisite number of data locations within the shift register. Each data location within the shift register 369, including the unused eighth data location, has a parallel input terminal 371 associated therewith and each parallel input terminal 371 is permanently grounded to a logic zero source. During startup of the tester, the same parallel load signal 256 and parallel clock signal 257 which are utilized to load the selected binary data into the shift register 45 are utilized to fill each data location of the shift register 369 with a logic zero from its associated parallel input lead 371. The presence of the logic one enable signal 250 at all times after the first clock phase 16 pulse causes a NAND circuit 374 to deliver a clock pulse to the shift register 369 each time a phase six clock pulse $\phi 6$ is provided to the second input thereof.

Unlike an ordinary shift register, the shift register 369 is adapted to generate an error signal of the Bose-Chaudhuri form by connecting the serial input signal 61 of the error generator and the serial output terminal 63 of the shift register 369 as inputs to the exclusive OR gate 366. In addition, the output of the inverter 367 which is utilized as an input to the first shift register data location is also provided along with the output signal 376 from the third shift register data location to an exclusive OR circuit 378, the output of the exclusive OR circuit 378 being used as an input to the fourth shift register data location. While the many combinations of 24 data bits which comprise a data message would be capable of forming a great number of different error codes within the shift register 369, it can be readily seen that the receipt by the error generator at its serial input terminal 61 of a particular 24-bit message will always result in the same contents within the shift register 369 at the end of the message transmission. Although the operation of the flip-flop 361 is inhibited during the generation of an error code for a message being transmitted to or received from a remote unit 21, the output of the NOR circuit 357 changes to a logic one state as soon as the 24-bit message portion of the transmission is either sent or received, thereby removing the reset signal from the reset input of the flip-flop 361. When a message is being transmitted, the last bit signal 321 also enables the NAND circuit 362 to transmit the inverted output of the flop-flop 361 to the NAND circuit 311 of FIG. 10 and to the remote unit as a part of the serial output signal 42. As soon as the flip-flop 361 is enabled, each data bit appearing at the data input terminal thereof on the serial output line 63 of the error code generator 62 in response to the clock output signal of the NAND circuit 374 is transferred to the output of the flip-flop 361 by the next phase one clock pulse $\phi 1$ applied to the clock input of the flip-flop 361. Whenever 7 data bits have been clocked through the flip-flop 361 to the input of the NAND circuit 362 and the exclusive OR circuit 381, the generation of a logic one $\overline{transmit}$ signal or a logic zero $\overline{restart}$ signal will halt clock operation as previously discussed.

When the shift register 45 is receiving a message and a positive message received signal 195 is generated upon receipt of the 24-bit message portion of the transmission from a remote unit 21, the presence of a logic one message received signal 195 at one input of the three input NAND gate 382 provides for display of an alarm signal each time a logic one signal is present as the output of the exclusive OR gate 381 during a phase seven $\phi 7$ clock pulse. As the error code signal presented to the serial input line 47 is received at the serial input terminal 61 of the error code generator 62 it is simultaneously provided as an input, along with the input 73 connected to the output of the flip-flop 361, to the exclusive OR gate 381. As long as the signal received from the output terminal 63 of the error code generator and passed to the input 73 of the exclusive OR gate 381 by the output of the flip-flop 361 is the same as the signal received at the input terminal 61, the output of the exclusive OR gate will be a logic zero causing a logic one input to be delivered from the NAND gate 382. When the signal at the input 73 differs from the signal at the input 61, however, a logic one signal is delivered by the exclusive OR gate 381 to an input of the NAND circuit 382 and, if both the output of the OR gate 381 and the message received signal 195 are positive during a positive phase seven $\phi 7$ clock pulse, the output of the NAND gate 382 becomes a logic zero.

The logic zero $\overline{general\ reset}$ signal 115 and the previous presence of a logic one output from the NAND gate 382 have caused the flip-flop 384 having NAND circuits 385 and 386 associated therewith to deliver a logic zero error output signal 75 from the output of the NAND bgate 385 up until the time that a logic zero is presented to the input of the NAND circuit 385. As soon as the NAND gate 382 produces a logic zero output, the error signal 75 becomes a logic one. This in turn causes the inverter 388 to ground the cathode of a light-emitting diode 391 which is connected at its anode through a load resistor 392 to a logic one voltage source. Although the light-emitting diode was not in a conducting state during the time that the error signal 75 was a zero and the inverter 388 provided a logic one bias at the cathode of the light-emitting diode 391, grounding of the cathode will cause a current to flow and light to be emitted from the diode signaling the operator that an error in transmission has been detected.

When a shift register 36 of the type illustrated is utilized, a Model No. MM74C95 4-bit right-shift left-shift register manufactured by the National Semiconductor Corporation of Santa Clara, Calif. can be utilized as each shift register portion 369a and 369b. When such elements are utilized terminal 6 of each shift register is connected to the parallel load signal 256; terminal 8 of each shift register is connected to the parallel clock signal 257; terminals 2, 3, 5, and 14 of each shift register are connected to ground; terminal 9 of the shift register 369a is utilized as the output terminal 63 of the error code genertor 62; terminal 1 of the shift register 369a is connected to the output of the exclusive OR gate 378; terminal 10 of the shift register 369b is connected to the input of the exclusive OR gate 378 as signal 376 thereto; terminal 1 of the shift register 369b is connected to the output of the inverter 367 and to the second input of the exclusive OR gate 378; and terminal 7 of each of the shift registers is connected to the output of the NAND gate 374.

A suitable circuit which may be utilized as the flip-flop 361 is one-half of Model MM74C74 dual D flip-flop manufactured by the National Semiconductor Corporation of Santa Clara, Calif. When such a device is utilized, pin 1 of the device is connected to the output of the NOR gate 357; pin 2 is connected to the output terminal 63 of the shift register 369; pin 3 is connected to the phase one clock signal $\phi 1$; pin 4 is connected to a logic one voltage source; and pin 5 is utilized as the output of the flip-flop 351 and is connected to the input terminal 73 of the exclusive OR gate 381 and to an input terminal of the NAND gate 362.

Figure 12:
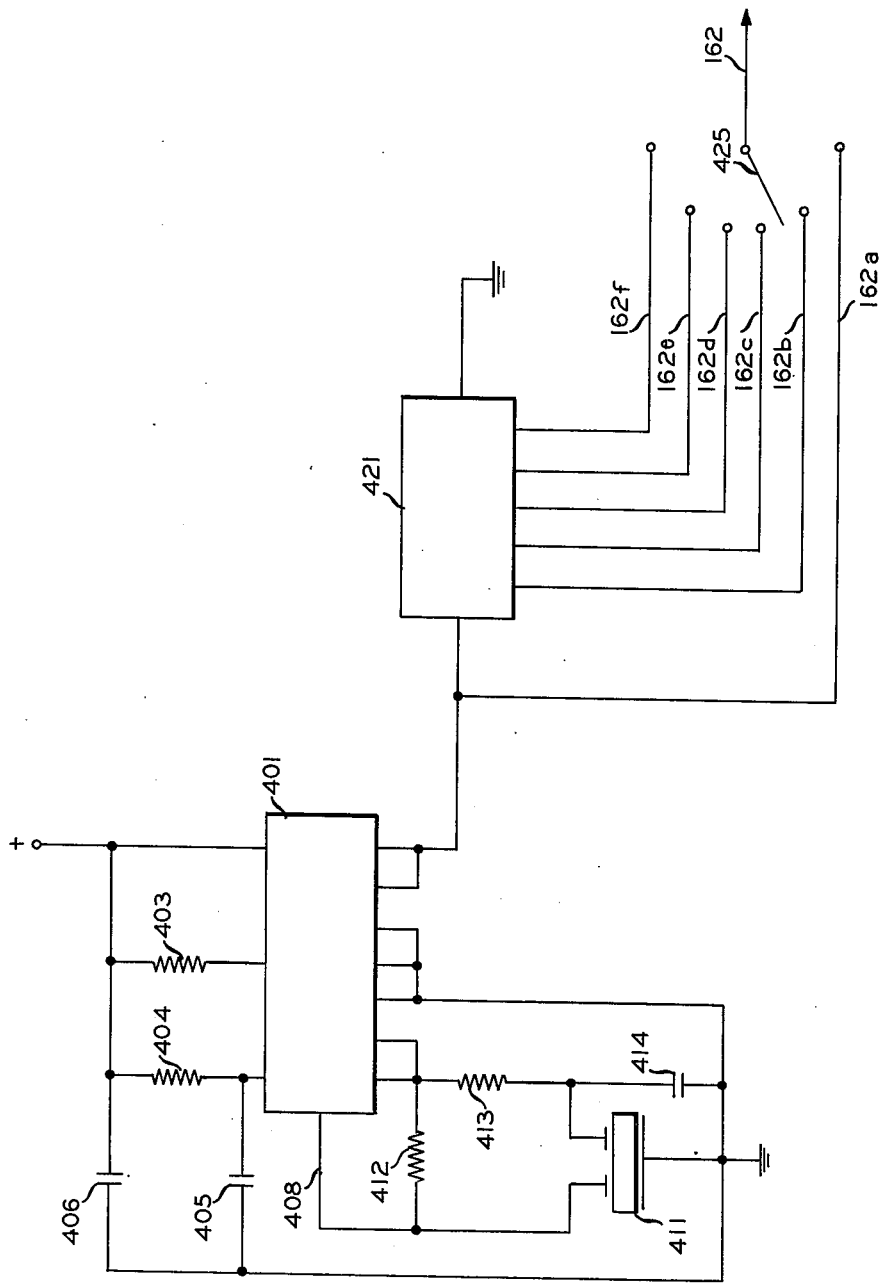

Although any oscillator can be utilized as the source of the oscillator source signal 162, a preferred oscillator circuit is illustrated in FIG. 12. In the circuit illustrated a dual complementary pair plus inverter circuit 401 such as an RCA Model CD4007A dual complementary pair plus inverter is utilized in the oscillator circuit by connecting pin 14 thereto to a positive logic one voltage source; by connecting pin 2 thereof through a resistor 403 to a logic one voltage source; by connecting pin 11 through a resistor 404 to a logic one voltage source and through a capacitor 405 to ground; by connecting a capacitor 406 between the logic one voltage source and ground; by connecting pin 10 to a lead 408 associated with a crystal 411 as illustrated; connecting pin 10 to pin 12 through a resistor 412; connecting pin 12 to the crystal 411 through a resistor 413 as illustrated; placing a capacitor 414 between the connection of the resistor 413 with the crystal 411 and ground; connecting pi 3 to pin 12; connecting pins 4, 7, and 9 to ground; and connecting pins 1 and 5 to the input of a frequency divider 421.

Although any suitable frequency divider 421 can be utilized, a specific circuit which can be used is an RCA Model CD402A 7-stage binary counter. When such a device is utilized as the frequency divider 421 and terminala 1 of the service is connected to the output signal 162a of the oscillator circuit 401, pin 2 is connected to ground, and pins 12, 11, 9, 6, and 5 are connected to frequency signals 162b, 162c, 162d, 162e, and 162f respectively, the signal 162a will be of the same frequency as the oscillator circuit output 401, output signal 162b will be one-half the frequency of signal 162a, signal 162c will be one-fourth the frequency of signal 162a, signal 162d will be one-eighth the frequency of signal 162a, signal 162e will be one-sixteenth the frequency of signal 162a, and signal 162f will be one-thirty second the frequency of 162a. A switch means 425 can be utilized to select the oscillator source signal 162 from output signals 152a-162f so that the clock rate of th tester 41 can be matched to the clock rate of the remote unit 21 to be tested.

When the apparatus and method illustrated by FIGS. 5-12 are utilized in conjunction with a binary logic system wherein the logic one positive voltage is a +5 volts and the frequency of the oscillator signal 162 is 76.8 KHz, suitable values for specific circuit components are as follows:

| FIG. 5 | |
|---|---|
| resistor 105 | 100K ohms |
| resistor 106 | 100K ohms |
| resistor 123 | 22K ohms |
| resistor 152 | 27K ohms |
| resistor 155 | 10K ohms |
| capacitor 124 | 22 microfarads |
| capacitor 151 | 0.47 microfarads |
| capacitor 154 | 0.01 microfarads |
| FIG. 6 | |
| resistor 173 | 22K ohms |
| resistor 172 | 100K ohms |
| FIG. 9 | |
| resistors 5a-5x | 470 ohms |
| FIG. 11 | |
| resistor 392 | 470 ohms |
| FIG. 12 | |
| resistor 403 | 10K ohms |
| resistor 404 | 100K ohms |
| resistor 412 | 22 megohms |
| resistor 413 | 150K ohms |
| capacitor 406 | 0.1 microfarads |
| capacitor 405 | 0.01 microfarads |
| capacitor 414 | 10 microfarads. |

Suitable light emitting diodes 4a-4x and 392 for use with the circuits of FIGS. 9 and 11 are Monsanto model MV-5023 diodes. A suitable crystal 411 for use with the circuit of FIG. 12 is a model 5X-IV crystal manufactured by the Statek Corporation of Orange, California. The NAND NOR, exclusive OR, and inverter circuit elements illustrated in FIGS. 5-11 can be chosen fro commercially available circuits such as, for example, RCA model 14001 quad 2-input NOR gate, model 4009 inverting type hex buffer/connector, model 4011 quad 2-input NAND gate, model 4023 triple 3-input NAND gate, and model 4030 quad exclusive-OR gate.

The apparatus and method of the invention can be utilized to transmit and receive any binary or binary coded data format such as binary coded decimal, hexidecimal, or other similar data formats which can be expressed in a plurality of logic one and logic zero data states. The apparatus of the invention can be modified by those skilled in the art to provide compound solid state switches as some or all of the switching means 2b-2x so that desired message data can be automatically entered into one or more data input lines 46b-46x by means of a dial, keyboard, tape, card, or other similar means. In addition, the light emitting diodes 4a-4x could be replaced by a decoding device and an associated digital display, typewriter or printout display, or other similar display means depending on space and power availability, without departing from the scope of the invention. In a similar manner, the error signal 75 can be utilized to actuate an audio, printed, or other type of alarm signal in addition to or in lieu of providing a visual alarm signal and display by means of the light emitting diode 391. Although the method and apparatus of the invention have been described in conjunction with a specific preferred embodiment thereof, reasonable modifications by those skilled in the art are possible within the foregoing description of the invention and the appended claims thereto.

What is claimed is:
1. Apparatus comprising:
 a test input means for receiving serial binary data;
 a test output means for transmitting serial binary data;
 means for establishing a preselected binary test message representative of a computer command;
 means for serially transmitting said test message from said test output means;
 means for generating a first error code in response to transmission of said test message;
 means for transmitting said first error code from said test output means;
 means for receiving and storing a serial binary message response received by said test input means; and
 means for displaying said message response.

2. Apparatus in accordance with claim 1 additionally comprising:
 means for generating a second error code in response to said message response received by said test input means;
 means for comparing said second error code to a third error code received by said test input means following receipt of said message response and generating an error signal in response to said third error code being different from said second error code; and means for establishing an error signal alarm in response to said error signal.

3. Apparatus in accordance with claim 2 additionally comprising a remote unit means, said remote unit means comprising:

means for receiving said test message and for generating and transmitting said message response in response to said test message;

means for generating a fourth error code in response to said test message;

means for comparing said first error code and said fourth error code and generating a remote error signal in response to said fourth error code being different from said first error code; and means for generating said third error code in response to transmission of said message response and for transmitting said third error code.

4. Apparatus comprising:

a test input means for receiving serial binary data;

a test output means for transmitting serial binary data;

means for extablishing a preselected binary test message representative of a computer command;

means for serially transmitting said test message from said test output means;

remote unit means for receiving said test message and generating a serial binary message response in response to said test message;

means for receiving and storing said message response received by said test input means; and means for displaying said message response.

5. Apparatus comprising:

a test input means for receiving serial binary data;

a test output means for transmitting serial binary data;

means for establishing a preselected binary test message representative of a computer command;

means for serially transmitting said test message from said test output means;

means for receiving a serial binary message response received by said test input means and for storing each binary data bit of said message response in a separate binary data storage location; and means for displaying said message response;

wherein said means for transmitting said test message and said means for receiving and storing said message response comprise a first shift register means for accepting said test message and serially shifting said test message to said test output means and for receiving a serial message response from said test input means and shifting said message response into the data locations of said first shift register means.

6. Apparatus in accordance with claim 5 additionally comprising first detector means for detecting receipt of a message response by said first shift register means and inhibiting further shifting of said first shift register in response thereto.

7. Apparatus in accordance with claim 6 additionally comprising a second shift register means for receiving said test message shifted from said first shift register to said test output means and for counting data bits received by said test input means following the operation of said first detector means to inhibit further shifting of said first shift register.

8. Apparatus in accordance with claim 7 additionally comprising second detector means for detecting the receipt by said second shift register of said test message and producing a second detector signal in response thereto, and third detector means for detecting the count by said second shift register means of a predetermined number of data bits received by said test input means following said operation of said first detector means and producing a third detector signal in response thereto.

9. Apparatus in accordance with claim 8 additionally comprising an error code generator means for generating a first error code in response to said test message shifted from said first shift register to said test output means and for generating a second error code in response to said message response received by said test input means; means responsive to said second detector signal for transmitting said first error code from said test output means; and mens responsive to said third detector signal for comparing said second error code with a third error code received at said test input means.

10. Test apparatus having a test input means and a test output means, said apparatus comprising:

a first shift register mens having a plurality of data bit locations, a serial input means for receiving serial binary data, a serial output means for delivering serial binary data, a parallel input means associated with each said data bit location for receiving parallel data, and a parallel output means associated with each said data bit location for delivering parallel data;

a switch means associated with each said parallel input means for providing a binary data bit thereto;

a display means associated with each said parallel output means for displaying the content of the associated data bit location;

an error code generating means having a serial input means and a serial output means for receiving a serial binary data message and delivering a serial binary error code in response thereto;

a second shift register means having a serial input means for receiving serial binary data, a serial output means for delivering serial binary data, a first intermediate output means for delivering a signal responsive to receipt of said data message having a first predetermined length and a second intermediate output means for delivering a signal responsive to the receipt of an error code of a second predetermined length;

first switch means responsive to said first intermediate output means of said second shift register means for operably connecting the serial input means of said second shift register means and said test output means to the serial output means of said first shift register means prior to receipt of said data message by said second shift register means and for operably connecting the serial input means of said second shift register and said test output means to the serial output means of said error code generating means following receipt of said data message by said second shift register means;

second switch means for operably connecting the serial input means of said first shift register means to said test input means when said second switch means is in a first condition and for operably connecting the serial input means of said first shift register means to the serial output means of said second shift register means when said second switch means is in a second condition;

third switch means for automatically operably connecting the serial input means of said error code generating means to the serial output means of said first shift register means when a data message is being serially shifted out of said first shift register means, and for automatically operably connecting the serial input means of said error code generating means to the serial input means of said first shift register means when a data message is being serially shifted into said first shift register means;

an error detector means having a first serial input means operably connected to the serial input means of said first shift register means, a second serial input means operably connected to the serial output means of said error code generator means, and an error signal output means, for comparing two error codes delivered to the two serial input means thereof and delivering an error signal from the output means thereof in response to a difference between the two received error codes.

11. Apparatus in accordance with claim 10 additionally comprising means for selecting among a plurality of rates at which serial data is shifted into and out of said first shift register, said error code generating means, said second shift register means and said error code detector means.

12. A method for testing a remote unit associated with a digital computation system, said method comprising:

removing said remote unit from communication with said digital computation system;

sending a serial binary test signal to said remote unit simulating a message transmission from said computation system;

generating a first error code in response to sending said test signal;

transmitting said first error code to the input of said remote unit;

receiving and storing a serial binary message response by said remote unit to said test signal;

generating a second error code in response to receiving said message response;

comparing said second error code to a third error code transmitted at the end of said message response from said remote unit;

generating an error signal if said second error code and said third error code differ; and displaying said message response.

13. A method for testing a remote unit associated with a digital computation system, said method comprising:

removing said remote unit from communication with said digital computation system;

sending a serial binary test message to said remote unit simulating a message transmission from said computation system;

receiving and storing a serial binary message response by said remote unit to said test signal; and displaying said message response; wherein sending said test signal comprises loading a binary data test message representative of a computer command into a first shift register means and serially shifting the test message from said first shift register means to the input of said remote unit; and wherein receiving and storing said message response comprises shifting a serial binary data response from said remote unit into said first shift register means and stopping said first shift register means upon receipt of said response.

14. A method in accordance with claim 13 additionally comprising:

serially shifting said test message from said first shift register to a second shift register;

serially shifting said test message from said second shift register into said first shift register;

stopping said first shift register upon receipt of said test message; and displaying said test message at a point in time adjacent the said steps of sending a test signal, receiving and storing a message response, and displaying said message response.

15. A method in accordance with claim 13 additionally comprising:

generating a first error code in response to the shifting of said test message from first shift register;

serially shifting said first error code to the input of said remote unit;

generating a second error code in response to the shifting of said response from said remote unit into said first shift register;

comparing said second error code to a third error code transmitted at the end of said message response from said remote unit; and generating an error signal if said second error code and said third error code differ.

16. A method in accordance with claim 13 comprising automatically retransmitting said test message from said first shift register means to said remote unit following receipt by said first shift register means of said response from said remote unit.

* * * * *